US010831337B2

(12) United States Patent
Agnoli et al.

(10) Patent No.: US 10,831,337 B2
(45) Date of Patent: Nov. 10, 2020

(54) DEVICE, METHOD, AND GRAPHICAL USER INTERFACE FOR A RADIAL MENU SYSTEM

(71) Applicant: Apple Inc., Cupertino, CA (US)

(72) Inventors: Giovanni M. Agnoli, Cupertino, CA (US); Adam J. Leonard, San Francisco, CA (US); Frank K. F. Lee, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 778 days.

(21) Appl. No.: 15/094,238

(22) Filed: Apr. 8, 2016

(65) Prior Publication Data

US 2017/0192627 A1 Jul. 6, 2017

Related U.S. Application Data

(60) Provisional application No. 62/275,184, filed on Jan. 5, 2016.

(51) Int. Cl.
*G06F 3/0482* (2013.01)
*G06F 3/0484* (2013.01)
*G06F 3/0485* (2013.01)

(52) U.S. Cl.
CPC .......... *G06F 3/0482* (2013.01); *G06F 3/0485* (2013.01); *G06F 3/04845* (2013.01); *G06F 3/04847* (2013.01)

(58) Field of Classification Search
CPC .. G06F 3/0482; G06F 3/04847; G06F 3/0485; G06F 3/04845; G06F 3/0488; G06F 3/04817; G06F 3/04812; G06F 3/048; G06F 3/04842; G06F 3/03547; H04N 5/44543; Y10S 345/902; Y10S 715/974

USPC ........ 345/173, 650, 902; 715/834, 810, 863, 715/841, 828

See application file for complete search history.

(56) References Cited

U.S. PATENT DOCUMENTS

| 4,823,283 | A  | * | 4/1989 | Diehm ..................... | G01R 1/025 345/902 |
| 6,448,987 | B1 | * | 9/2002 | Easty ..................... | G06F 3/0482 715/834 |
| 7,036,091 | B1 | * | 4/2006 | Nguyen ................. | G06F 3/0482 348/E5.002 |
| 7,516,419 | B2 | * | 4/2009 | Petro ..................... | G06F 3/0482 345/184 |

(Continued)

*Primary Examiner* — Matthew Ell
*Assistant Examiner* — Maria S Ayad
(74) *Attorney, Agent, or Firm* — Fernando & Partners, LLP

(57) ABSTRACT

An electronic device displays a radial menu including a first sequence of selectable options that extends off an edge of the display so that a first portion of the first sequence of selectable options is displayed while a second portion of the first sequence of selectable options is not displayed. The radial menu also includes a first selection region at a first fixed location on the radial menu. While a first option in the first sequence of selectable options is displayed in the first selection region of the radial menu, the electronic device detects an option-selection input associated with the radial menu. Responsive to detecting the option-selection input, the electronic device slides the first sequence of selectable options around the perimeter of the radial menu so that the first option is moved out of the first selection region and a second option is moved into the first selection region.

22 Claims, 23 Drawing Sheets

(56) References Cited

U.S. PATENT DOCUMENTS

| | | | |
|---|---|---|---|
| 8,375,329 B2 | 2/2013 | Drayton et al. | |
| 8,707,211 B2 | 4/2014 | Yasui et al. | |
| 10,025,462 B1* | 7/2018 | Ledet | G06F 3/04847 |
| 10,198,148 B2* | 2/2019 | Shaw | G06F 3/0488 |
| 2002/0122031 A1* | 9/2002 | Maglio | G06F 3/0233 |
| | | | 345/184 |
| 2004/0250217 A1* | 12/2004 | Tojo | G06F 3/0482 |
| | | | 715/810 |
| 2007/0256029 A1* | 11/2007 | Maxwell | G06F 3/0482 |
| | | | 715/834 |
| 2007/0271528 A1* | 11/2007 | Park | G06F 3/0482 |
| | | | 715/810 |
| 2009/0007012 A1* | 1/2009 | Mandic | G06F 3/0481 |
| | | | 715/810 |
| 2010/0141609 A1* | 6/2010 | Frisbee | G06F 3/0362 |
| | | | 345/184 |
| 2010/0185970 A1* | 7/2010 | Benenson | G06F 3/0482 |
| | | | 715/772 |
| 2010/0281374 A1* | 11/2010 | Schulz | G06F 3/0482 |
| | | | 715/723 |
| 2013/0219340 A1* | 8/2013 | Linge | G06F 3/04883 |
| | | | 715/834 |
| 2013/0278710 A1* | 10/2013 | Mock | H04N 7/152 |
| | | | 348/14.03 |
| 2014/0007019 A1* | 1/2014 | Saukko | G06F 3/0484 |
| | | | 715/863 |
| 2014/0075388 A1 | 3/2014 | Kuscher et al. | |
| 2014/0092100 A1* | 4/2014 | Chen | G06F 3/0482 |
| | | | 345/473 |
| 2014/0123063 A1* | 5/2014 | Hwang | G06F 3/0482 |
| | | | 715/810 |
| 2014/0157200 A1* | 6/2014 | Jeon | G06F 3/0482 |
| | | | 715/834 |
| 2015/0346994 A1* | 12/2015 | Chanyontpatanakul | G06Q 30/0641 |
| | | | 715/828 |
| 2016/0320923 A1* | 11/2016 | Hossain | G06F 3/0482 |
| 2016/0364089 A1* | 12/2016 | Blackman | G06F 3/0482 |

* cited by examiner

DEVICE, METHOD, AND GRAPHICAL USER INTERFACE FOR A RADIAL MENU SYSTEM

CROSS-REFERENCE TO RELATED APPLICATION

This application claims the benefit of U.S. Provisional Application No. 62/275,184, filed Jan. 5, 2016, which is incorporated herein by reference in its entirety.

TECHNICAL FIELD

This disclosure relates generally to user interfaces, and in particular to user interfaces for providing an options menu by an electronic device.

BACKGROUND

Applications executed by electronic devices often provide menus of options available within the applications. Users of the electronic device interact with the menu to, for example, select settings of the application or apply options to content within the application. These menus are often displayed as a separate user interface within the application, such that a user navigates away from a main portion or content of the application to access the menu. Switching between the main portion of the application and the menu is inconvenient to a user and increases an amount of time the user spends selecting desired options within the application. An increased time spent selecting from menu item makes the application appear more difficult and complex to the user and reduces the quality of the user experience. In addition, because the user is spending more time interacting with the menus rather than making substantive decisions as the content of the application, it takes generally longer for a user to complete a desired task, thus requiring typically more energy to be consumed by the device, and thus more quickly reducing battery life on portable devices.

SUMMARY

Accordingly, an improved user interface of an electronic device for providing an options menu is described. Devices, methods, and graphical user interfaces for a menu of options enables users of electronic devices to view and select available options more effectively and efficiently, improving a speed of user interactions with the options menu to make such selections, and thereby decreasing energy used by the electronic devices, and potentially extending the battery life of the device.

In accordance with some embodiments, a radial menu is displayed on a display of an electronic device, such as a touch-sensitive display. The radial menu includes a first sequence of selectable options that extends off of an edge of the display so that a first portion of the first sequence of selectable options is displayed while a second portion of the first sequence of selectable options is not displayed. The radial menu also includes a first selection region at a first fixed location on the radial menu.

While a first portion in the first sequence of selectable options is displayed in the first selection region of the radial menu, an option-selection input associated with the radial menu is detected, such as a touch input. Responsive to detecting the option-selection input, the first sequence of selectable options is slid around a perimeter of the radial menu so that the first option is moved out of the first selection region of the radial menu and a second option is moved into the first selection region of the radial menu.

The features and advantages described in this summary and the following detailed description are not all-inclusive. Many additional features and advantages will be apparent to one of ordinary skill in the art in view of the drawings, specification, and claims.

DETAILED DESCRIPTION

Figure 1A:
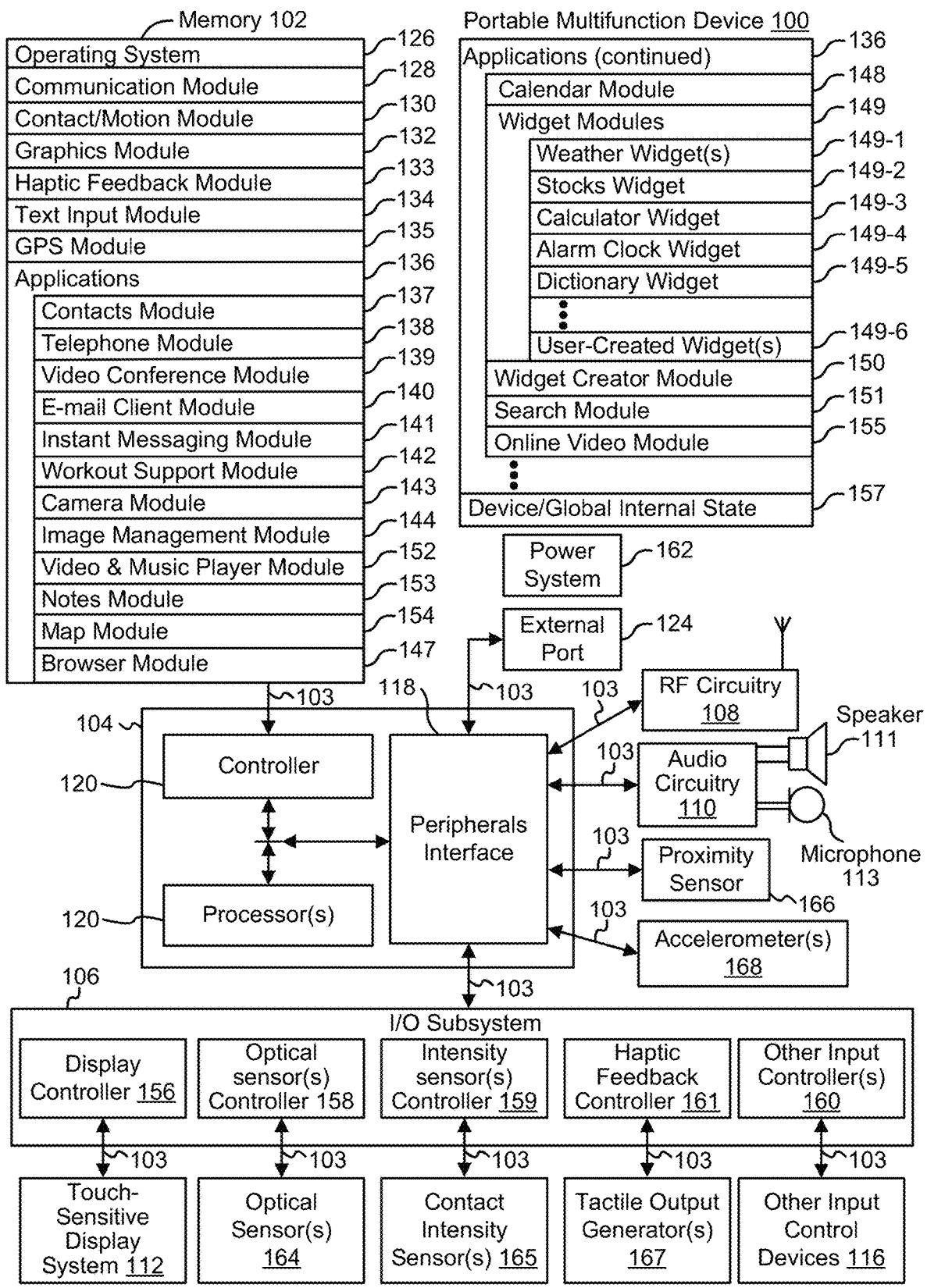
FIG. 1A is a block diagram illustrating a portable multi-function device with a touch-sensitive display in accordance with some embodiments.

An electronic device having a display, displays a radial menu user interface. The radial menu displays selectable options, which in some embodiments are options associated with content in an application executed by the electronic device. For example, the radial menu provides a menu of settings for a camera application (e.g., flash settings or zoom settings), options for photo editing (e.g., filters, title styles, or stickers), or options for video editing (e.g., themes or background music). The devices, methods, and graphical user interfaces described herein provide efficient display and selection of options, enabling users to use the options menu more effectively and efficiently.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as a "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in some embodiments. Touch screen 112 and display controller 156 optionally detect contact and any movement or breaking thereof using any of a plurality of touch-sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
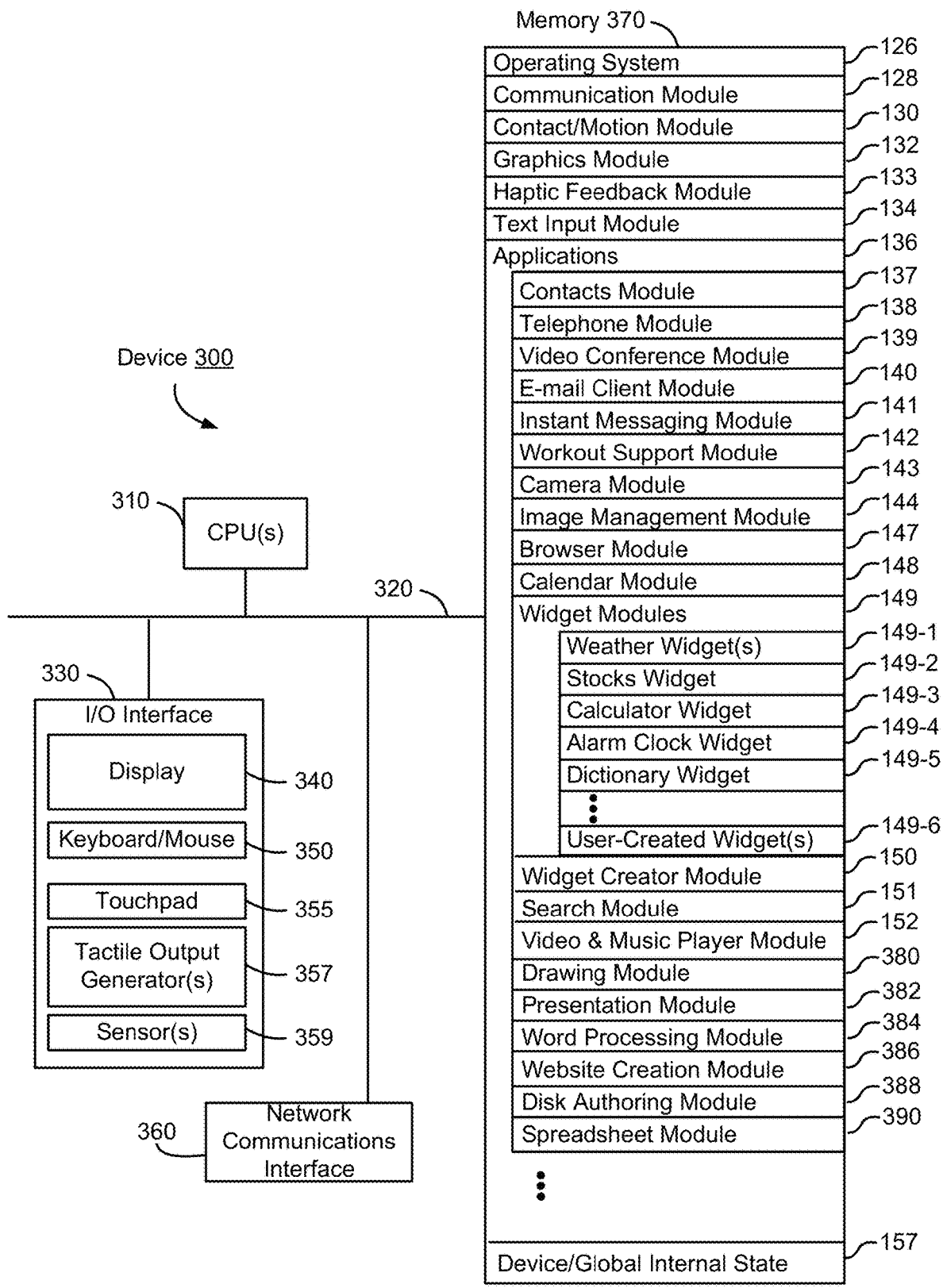
FIG. 3 is a block diagram of an exemplary multifunction device with a display and a touch-sensitive surface, in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which is, optionally, made up of a video player module and a music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some embodiments, the menu button is a physical push button or other physical input control device instead of a touchpad.

Figure 1B:
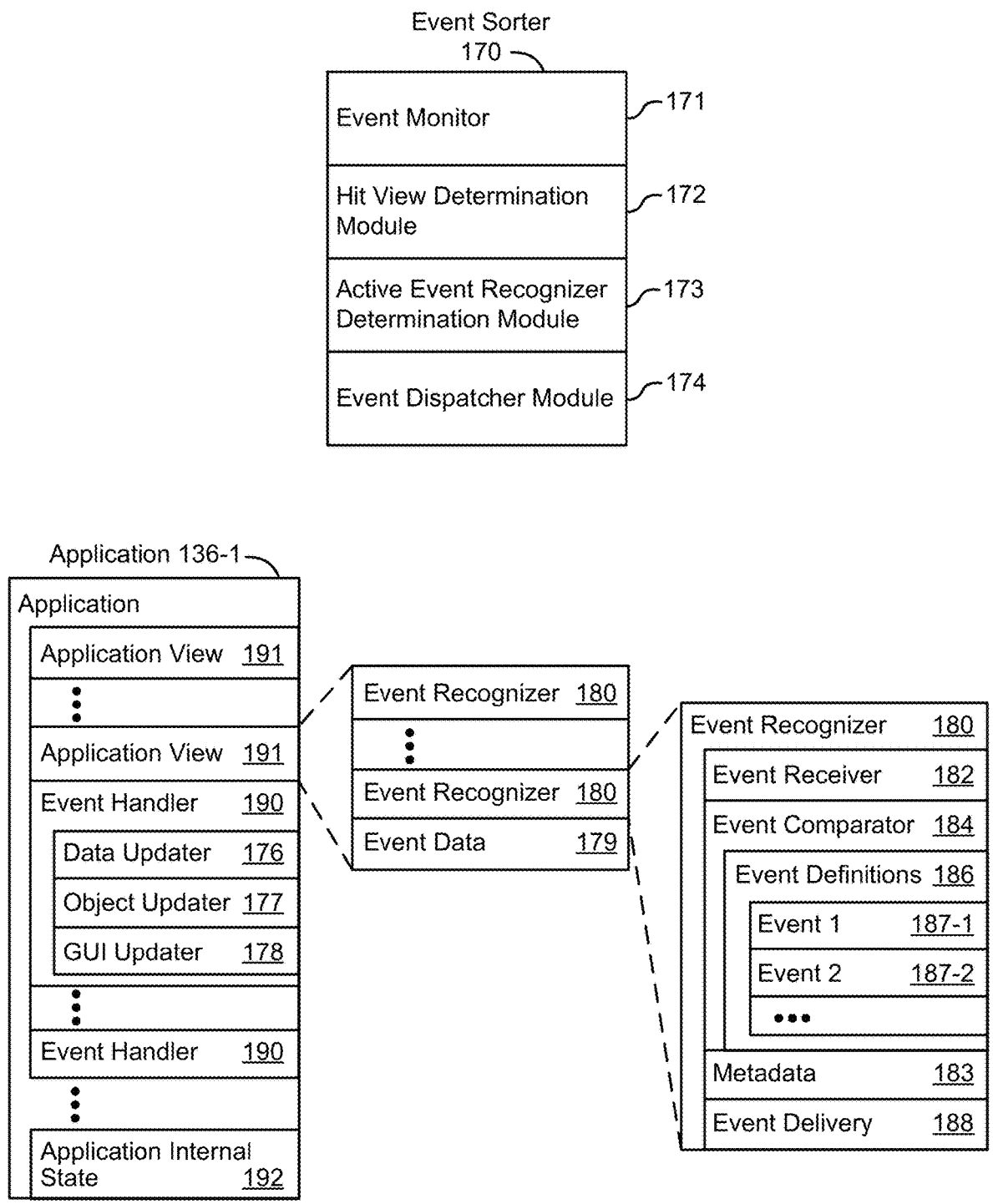
FIG. 1B is a block diagram illustrating exemplary components for event handling, in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In some embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In some embodiments, active event recognizer determination module 173 determines that all views that include the physical location of a sub-event are actively involved views, and therefore determines that all actively involved views should receive a particular sequence of sub-events. In some embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In some embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In some embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In some embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
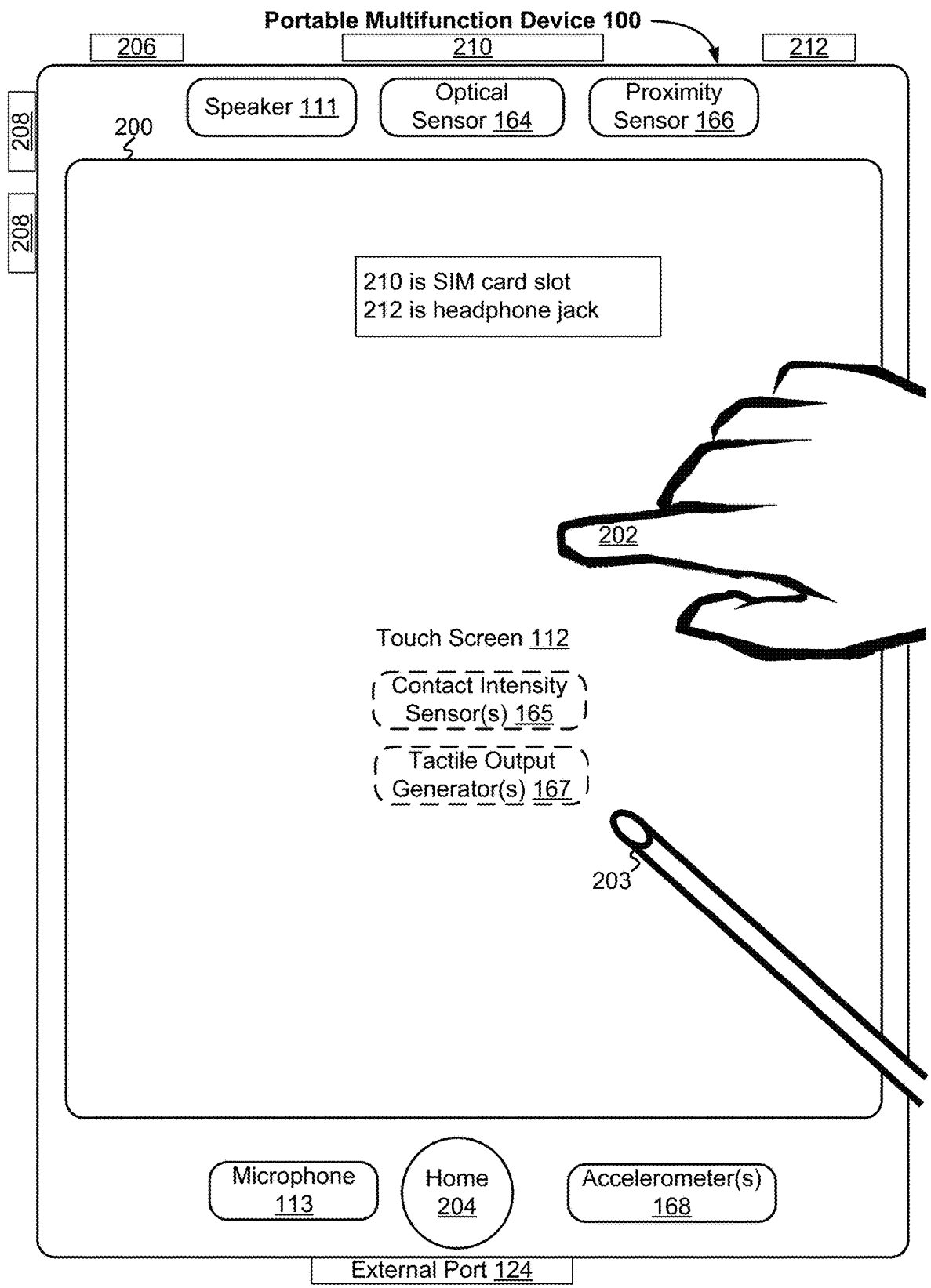
FIG. 2 illustrates a portable multifunction device having a touch screen, in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, Subscriber Identity Module (SIM) card slot 210, head set jack 2 12, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
FIG. 4A illustrates an exemplary user interface for a menu of applications on a portable multifunction device, in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
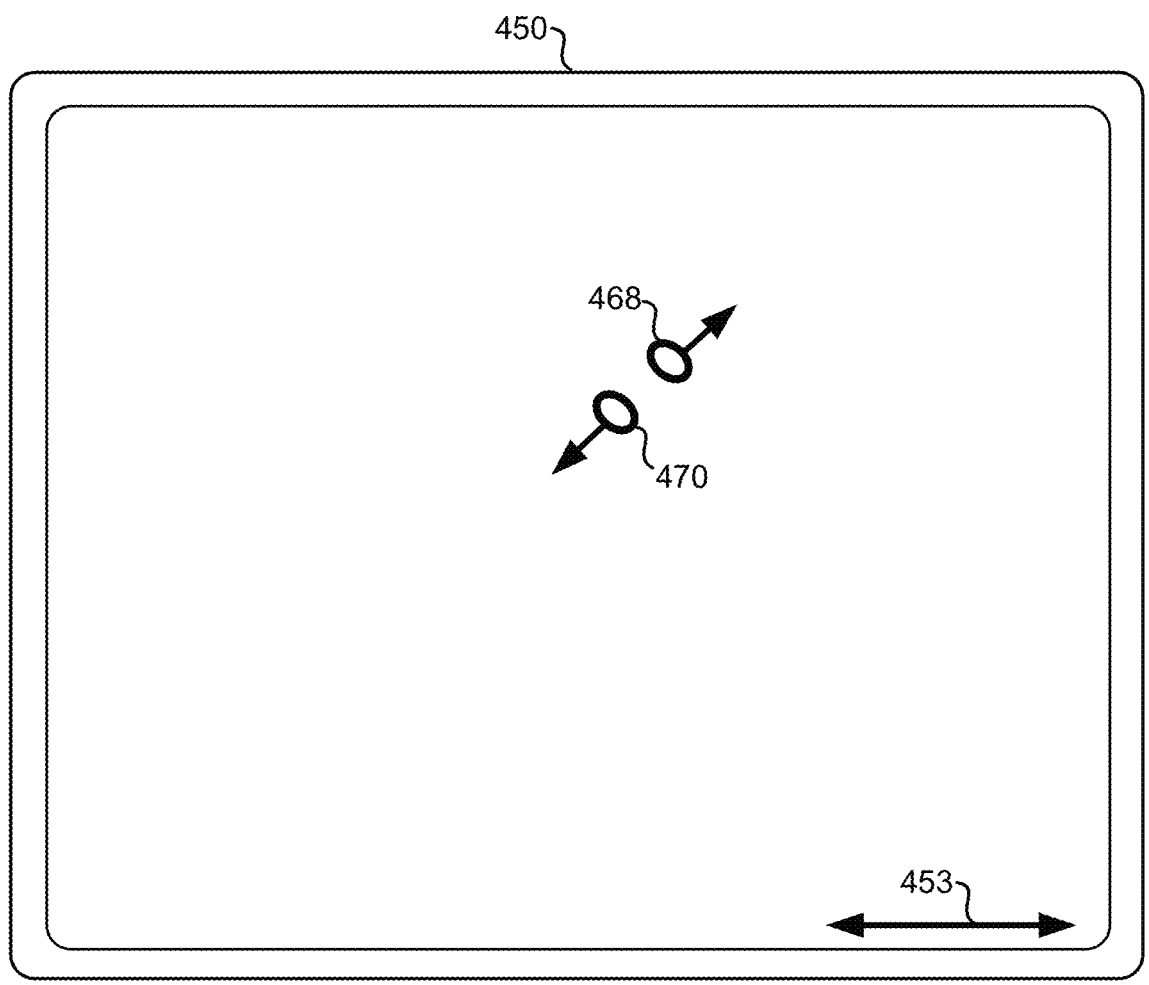
FIG. 4B illustrates an exemplary user interface for a multifunction device with a touch-sensitive surface that is separate from the display, in accordance with some embodiments.
Figure 4B:
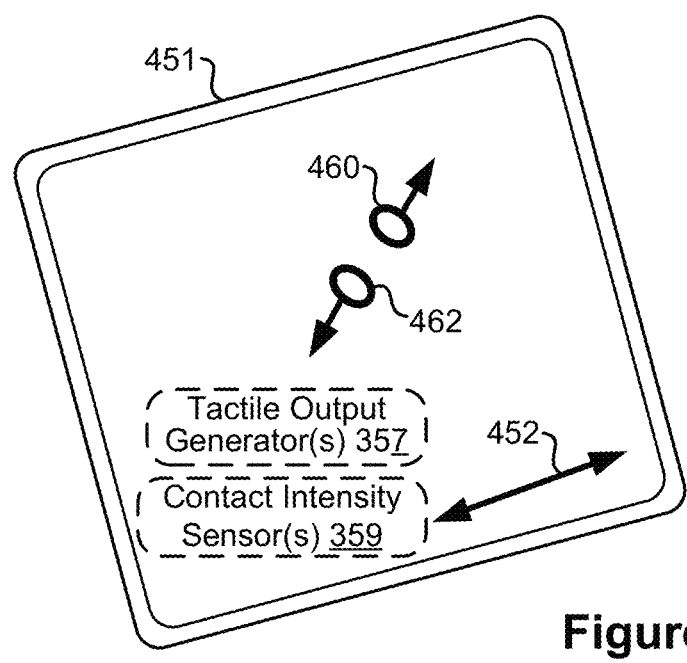

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or touch screen 112 in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed towards embodiments of user interfaces ("UI") and associated processes that may be implemented on an electronic device with a display and an input device, such as a touch-sensitive surface or a mouse and keyboard. For example, embodiments of user interfaces and associated processes are implemented on device 300 or portable multifunction device 100.

Figure 5:
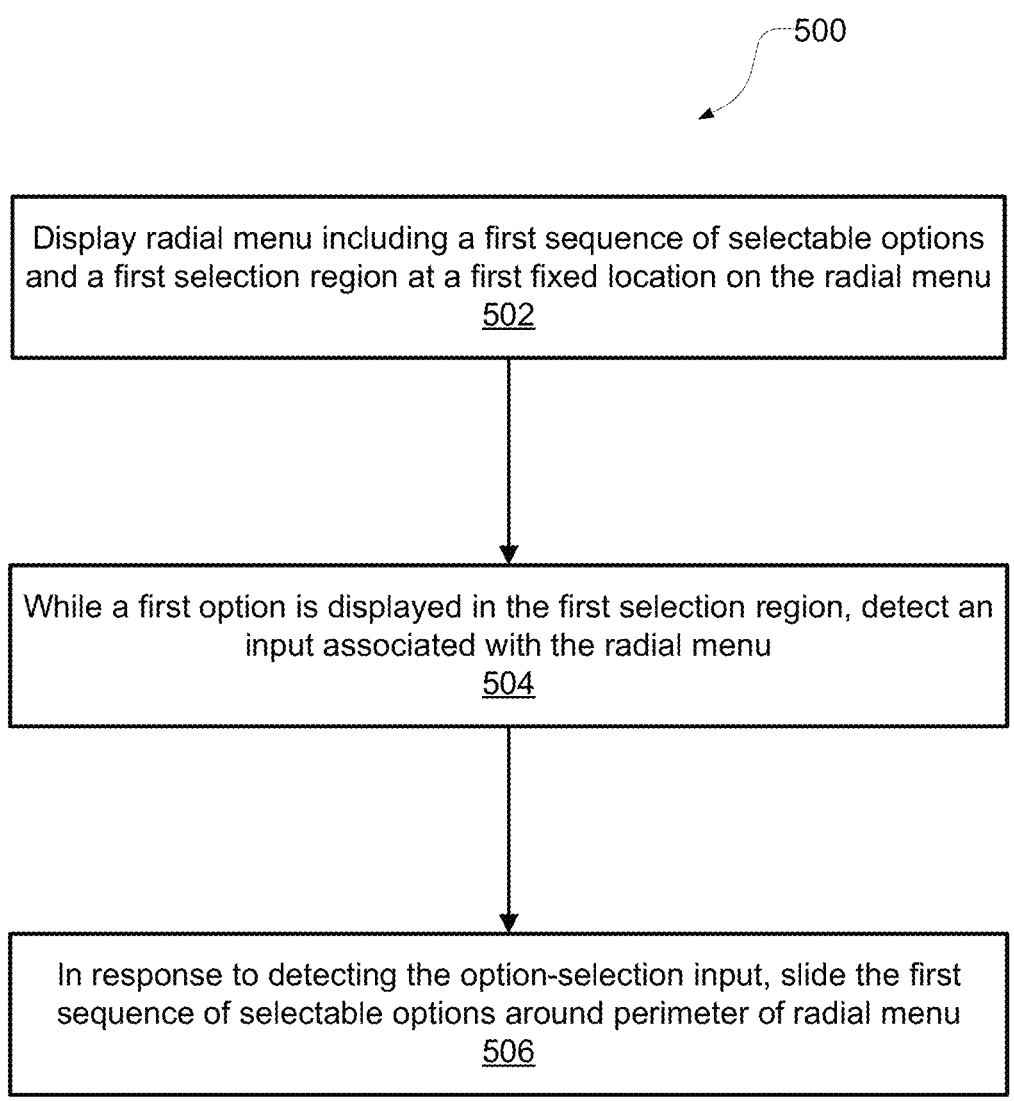
FIG. 5 is a flowchart illustrating an exemplary method for providing a radial menu user interface, in accordance with some embodiments.

FIG. 5 is a flowchart illustrating a method 500 for providing a radial menu of options. The method 500 is performed at an electronic device with a display, such as a touch-sensitive display, such as the portable multifunction device 100 shown in FIG. 1A or device 300 shown in FIG. 3, as may be controlled by specially programmed code (computer programming instructions) contained in the graphics module 132, wherein such specially programmed code is not natively present in the device 300. Some embodiments of the method 500 may include fewer, additional, or different steps than those shown in FIG. 5, and the steps may be performed in different orders. The steps of the method 500 are described with respect to example user interfaces illustrated in FIGS. 6A-6D.

Figure 6A:
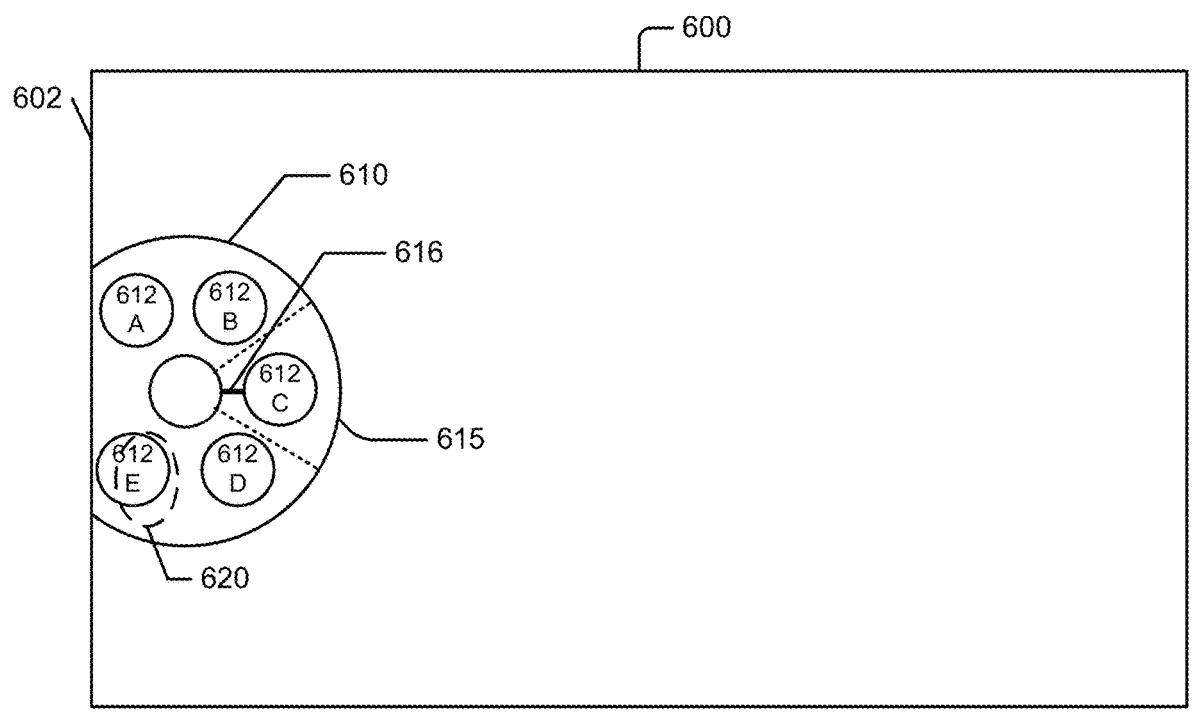
FIG. 6A illustrates a radial menu displayed by an electronic device and a first input received by the electronic device, in accordance with some embodiments.

For the purposes of explanation, it is assumed that an application executing on the electronic device has a menu for which there are a plurality of selectable options (e.g., menu items). Referring to FIGS. 5 and 6A-D, the electronic device displays 502 a radial menu 610 on a display 600. As shown in FIG. 6A, the radial menu 610 includes a first sequence of selectable options 612. A portion of the radial menu 610 including a selectable option extends off an edge 602 of the display 600 so that a first portion of the first sequence of selectable options (e.g., selectable options 612A, B, C, D, and E) is displayed while a second portion of the first sequence of selectable options is not displayed (e.g., option 612F). In some embodiments, as shown in FIG. 6A, the radial menu 610 has a substantially circular (or elliptical) shape and is displayed at the edge 602 of the display 600 (e.g., a left, right, top, or bottom edge of the display 600). Displaying the radial menu 610 as a circular segment at the edge 602 of the display may provide easier access to a center of the radial menu than displaying the radial menu 610 at an interior of the display 600 (e.g., offset from the edges of the display).

The radial menu 610 also includes a first selection region 615 displayed a first fixed location with respect to the radial menu. For example, the first selection region 615 is a fixed portion of the radial menu 610. In the example of FIG. 6A, the option 612C is displayed within the selection region 615. In some embodiments, the first selection region 615 is identified by an indicator 616, such as an arrow or line (as shown, for example, in FIG. 6A). For example, the option 612C is displayed in the first selection region 615 in FIG. 6A because the option 612C is aligned with the indicator 616. Alternatively, the first selection region 615 may be visually demarcated on the radial menu 610 by lines or shading, or displayed in a different color than other portions of the radial menu 610. In this case, an option is displayed in the first selection region 615 when the option is displayed in the visually demarcated region of the radial menu 610. The first selection region 615 may not be visually distinguished from other portions of the radial menu 610 in some embodiments.

Figure 6B:
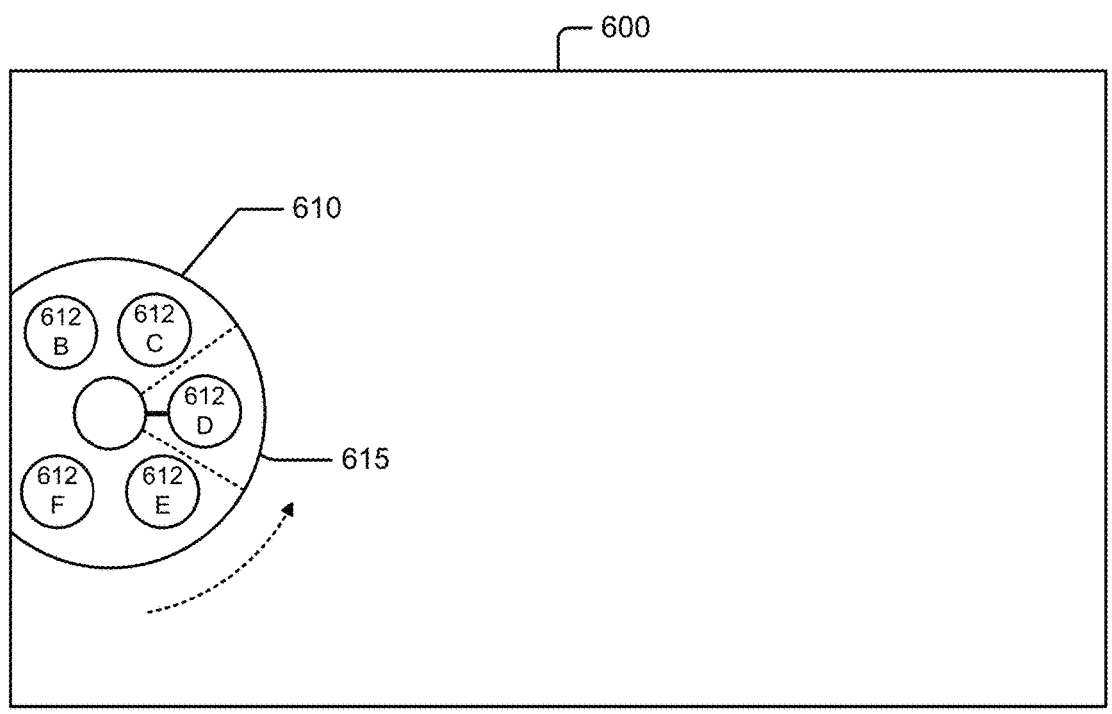
FIG. 6B-6C illustrate sliding a first sequence of options around a perimeter of a radial menu, in accordance with some embodiments.

While a first option (e.g., option 612C) is displayed in the first selection region 615 of the radial menu 610, the electronic device detects 504 an option-selection input 620 associated with the radial menu 610. Responsive to detecting the option-selection input 620, the electronic device slides 506 the first sequence of options 612 around a perimeter of the radial menu 610 so that the first option 612C is moved out of the first selection region 615 of the radial menu 610 and a second option (e.g., 612E) is moved into the first selection region 615. FIG. 6B illustrates the selectable options 612 partially rotated around the radial menu 610 (e.g., so that the option 612D is displayed in the first selection region 615), and FIG. 6C illustrates a final position of the selectable options 612 with the option 612E displayed in the selection region 615.

In some embodiments, as shown for example in FIG. 6A, the option-selection input 620 includes an input (such as a tap gesture on a touch-sensitive surface) at a location on the display 600 that corresponds to the option 612E. In response to the selection input 620, the electronic device slides the options 612 around the perimeter of the radial menu 610 until the option 612E corresponding to the location of the input 620 is displayed in the first selection region 615. In some embodiments, the option-selection input 620 includes a movement (e.g., a swipe gesture or a drag gesture on a touch-sensitive surface or a lateral movement of a mouse) at a location on the display 600 that corresponds to a side of the radial menu 610. In response to the selection input 620, the electronic device slides the options 612 around the perimeter of the radial menu 610 by scrolling the options 612 in accordance with a direction of the movement and the side of the radial menu 610. For example, if the swipe gesture moves to the right of the display 600 and is near a bottom of the radial menu 610, the sequence of selectable options 612 are moved counterclockwise. If the swipe gesture moves to the left of the display 600 and is near the bottom of the radial menu 610, the sequence of selectable options 612 are moved clockwise. In some embodiments, the sequence of selectable options 610 is slid around the radial menu 610 with simulated inertia and is stopped with an option 612 fully in the selection region 615.

In some embodiments, in response to the second option 612E being moved into the selection region 615 of the radial menu 610, the radial menu 610 further includes a representation of the second option 612E. For example, as shown in FIG. 6D, the electronic device displays an icon 630 representing the second option 612E at a center of the radial menu 610.

Figure 6C:
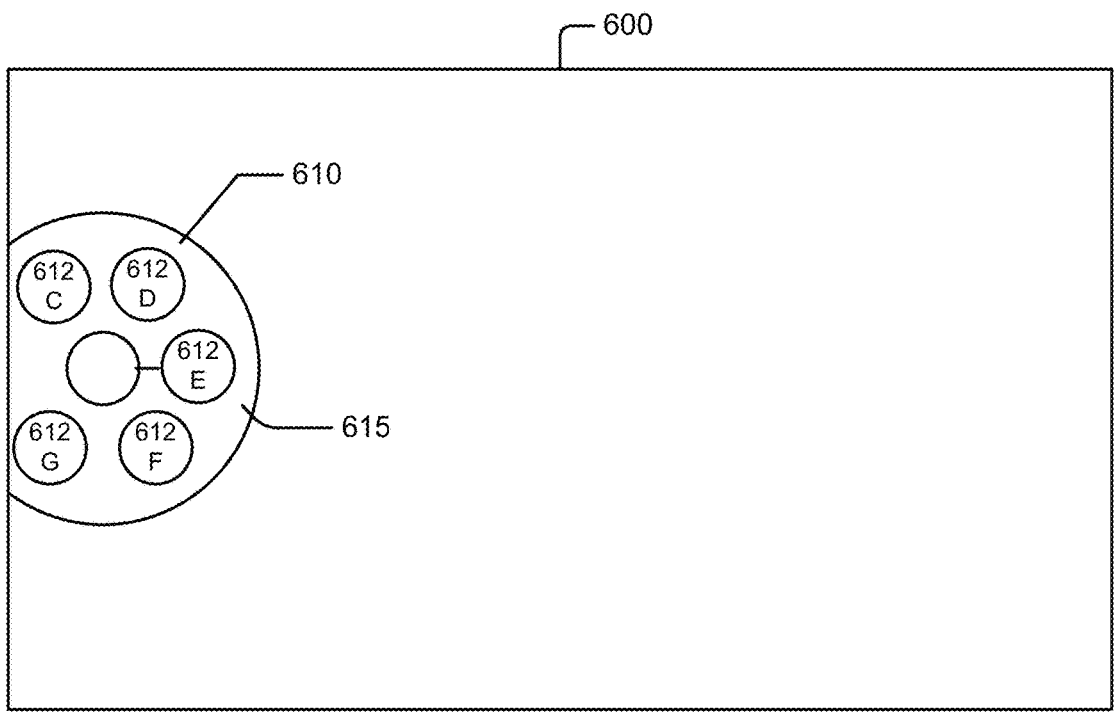
Figure 6D:
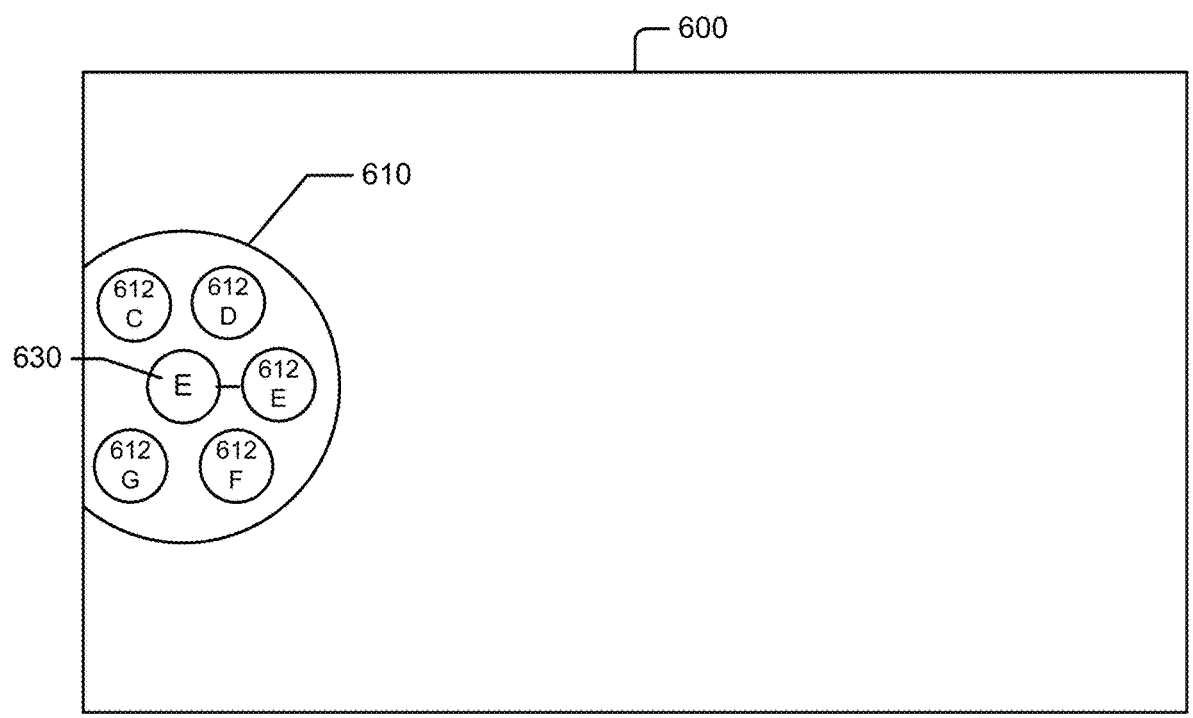
FIG. 6D illustrates an icon associated with a second option displayed on the radial menu, in accordance with some embodiments.

In some embodiments, as shown in FIGS. 6A-6C, the sequence of selectable options 610 includes more options than can be displayed simultaneously within the radial menu 610. For example, a portion of the radial menu corresponding to each of the selectable options 612 has an arc length, and the sum of the arc lengths of the portions corresponding to options 612 in the first sequence is greater than an angle subtended by the radial menu 610. When sliding the options 612 around the perimeter of the radial menu 610, the electronic device scrolls at least a subset of the options 612 onto the display 600 from the edge 602 and scrolls at least a subset of the options 612 off the display at the edge 602. For example, FIG. 6B illustrates an option 612F scrolled onto the display 600 and an option 612A scrolled off the display 600 as the options 612 are slid around the radial menu 610. FIG. 6C further illustrates an option 612G has been scrolled onto the display 600, while an option 612B has been scrolled off the display 600.

Figure 7A:
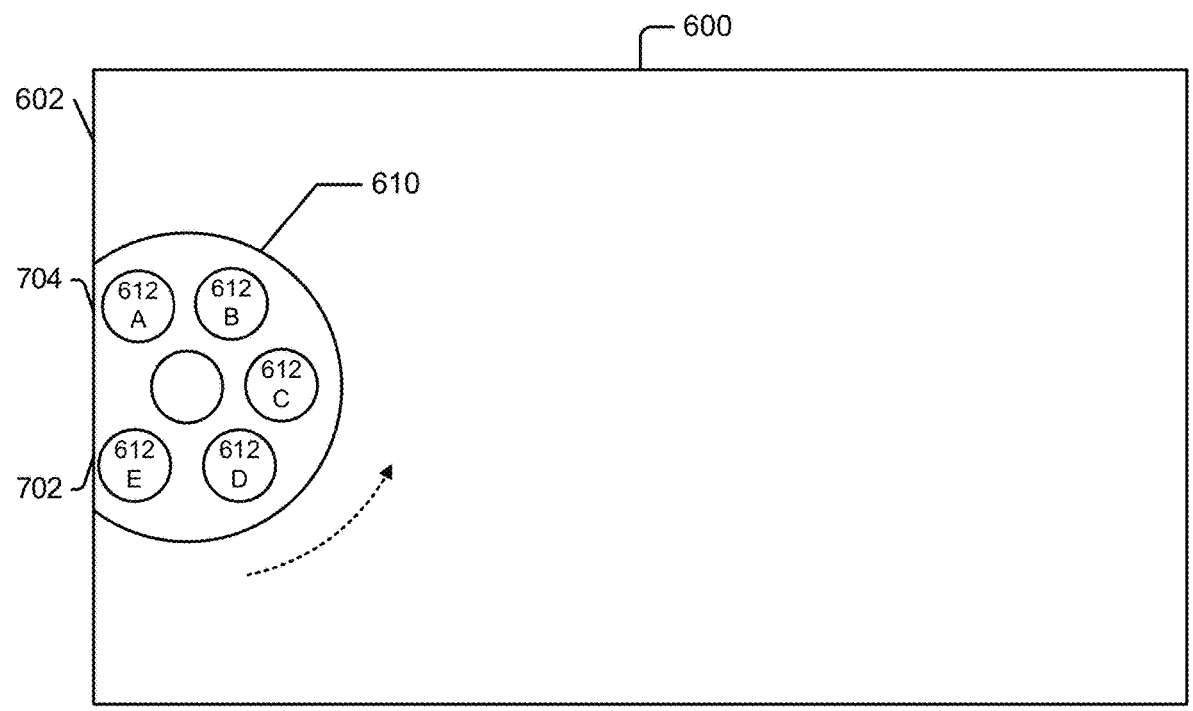
FIGS. 7A-7D illustrate sliding selectable options around the radial menu, in accordance with some embodiments.
Figure 7B:
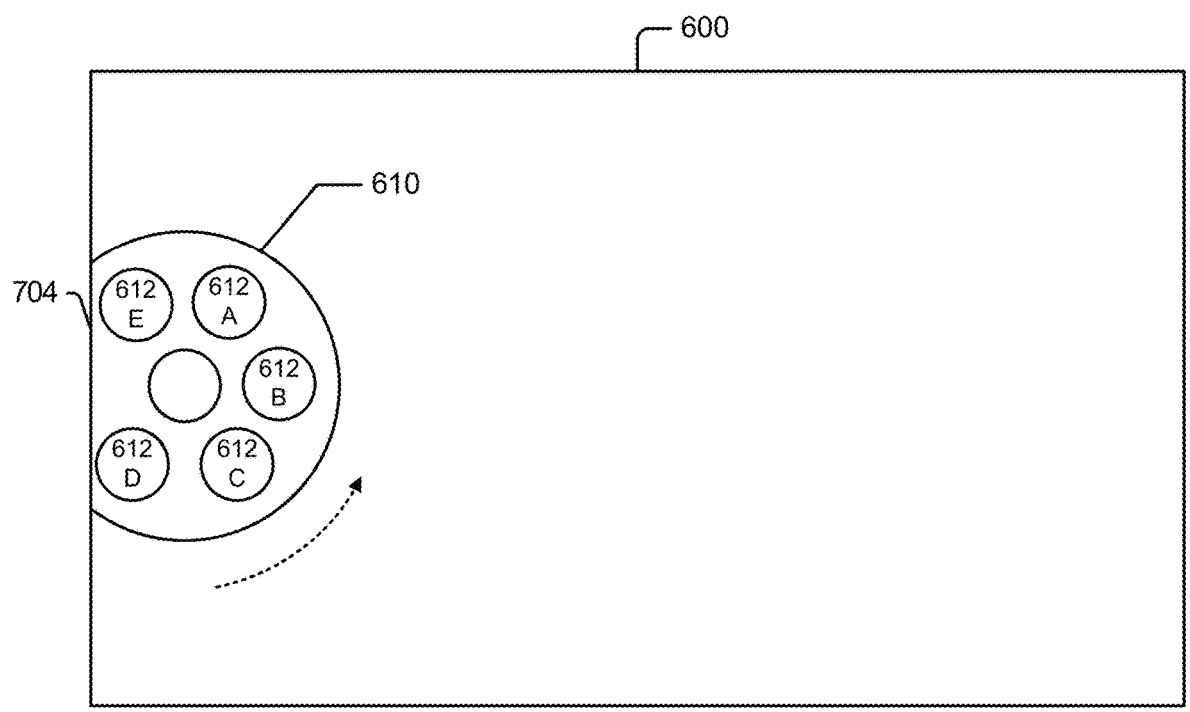
Figure 7C:
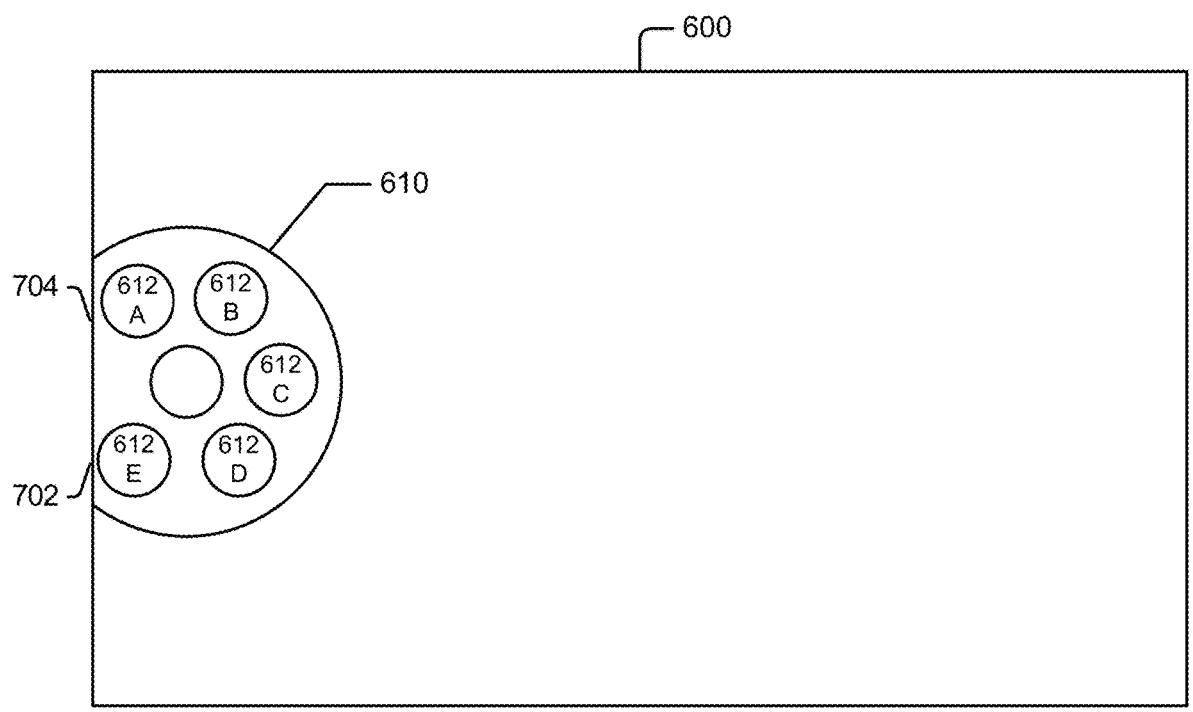
Figure 7D:
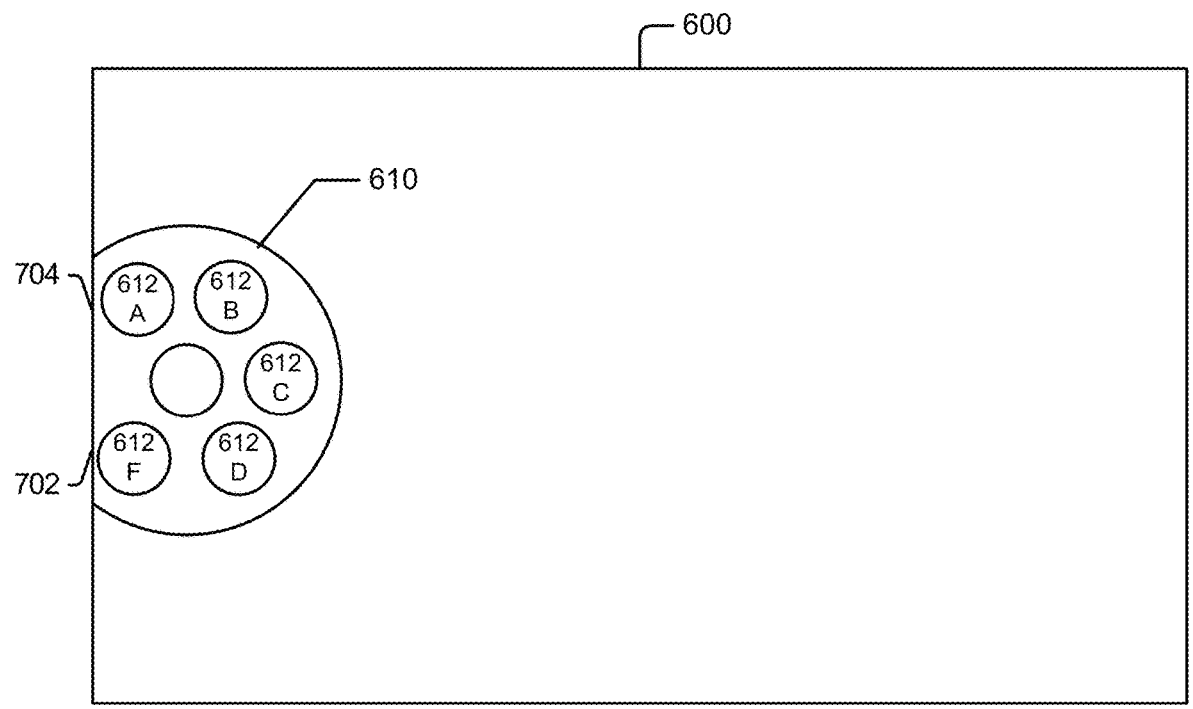

FIGS. 7A-7D illustrate some embodiments for sliding the selectable options 612 around the radial menu 610. As shown in FIG. 7A, a first boundary 702 and a second boundary 704 of the radial menu 610 are displayed at the edge 602 of the display 600. The electronic device slides the options 612 around the perimeter of the radial menu 610 such that an option (e.g., the option 612E) slides to the second boundary 704 (e.g., from the first boundary 702 or from a position on the radial menu 610 between the first boundary 702 and the second boundary 704). FIG. 7B illustrates the option 612E slid to the second boundary 704 of the radial menu 610. In some embodiments, in response to further sliding the sequence of selectable options 612 around the perimeter of the radial menu 610, the electronic device slides the option 612E off the radial menu at the second boundary 704 and redisplays the option 612E at next to the first boundary 702 within the radial menu, as shown in FIG. 7C. In some embodiments (e.g. where option 612e is not redisplayed next to the first boundary), in response to further sliding the sequence of selectable options 612 around the perimeter of the radial menu 610, the electronic device slides the option 612E off the radial menu at the second boundary 704 and displays another option 612F at the first boundary 702, as shown in FIG. 7D.

Figure 8A:
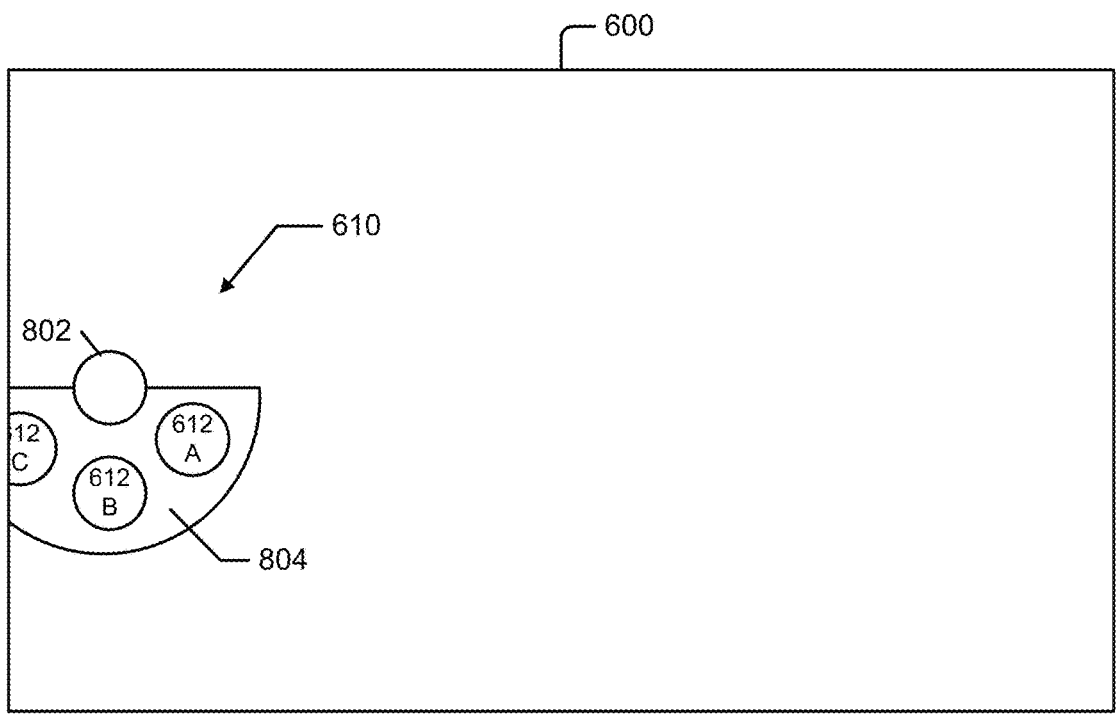
FIG. 8A illustrates a first ring of the radial menu partially surrounding a center region, in accordance with some embodiments.
Figure 8B:
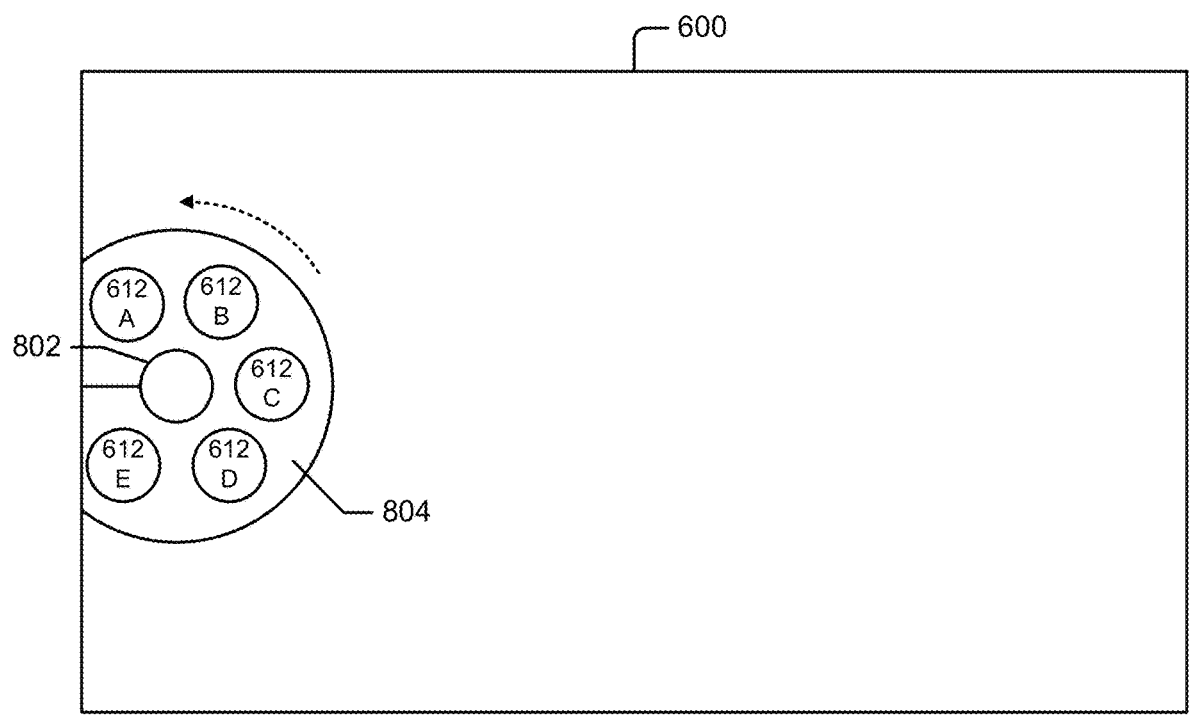
FIG. 8B illustrates the first ring of the radial menu fully surrounding the center region, in accordance with some embodiments.

FIGS. 8A-8B illustrate some embodiments of the radial menu 610 including a center region 802 and a circular segment 804, where the circular segment 804 displays the first sequence of selectable options 612. Before the selectable options 612 are slid around the perimeter of the radial menu 610, the circular segment 804 surrounds a portion of the center region 802, as shown in FIG. 8A. As the options 612 are slid around the radial menu 610, the electronic device increases the portion of the center region 802 that is surrounded by the circular segment 804. For example, FIG. 8B illustrates the circular segment 804 fully surrounds the center region 802.

Figure 9A:
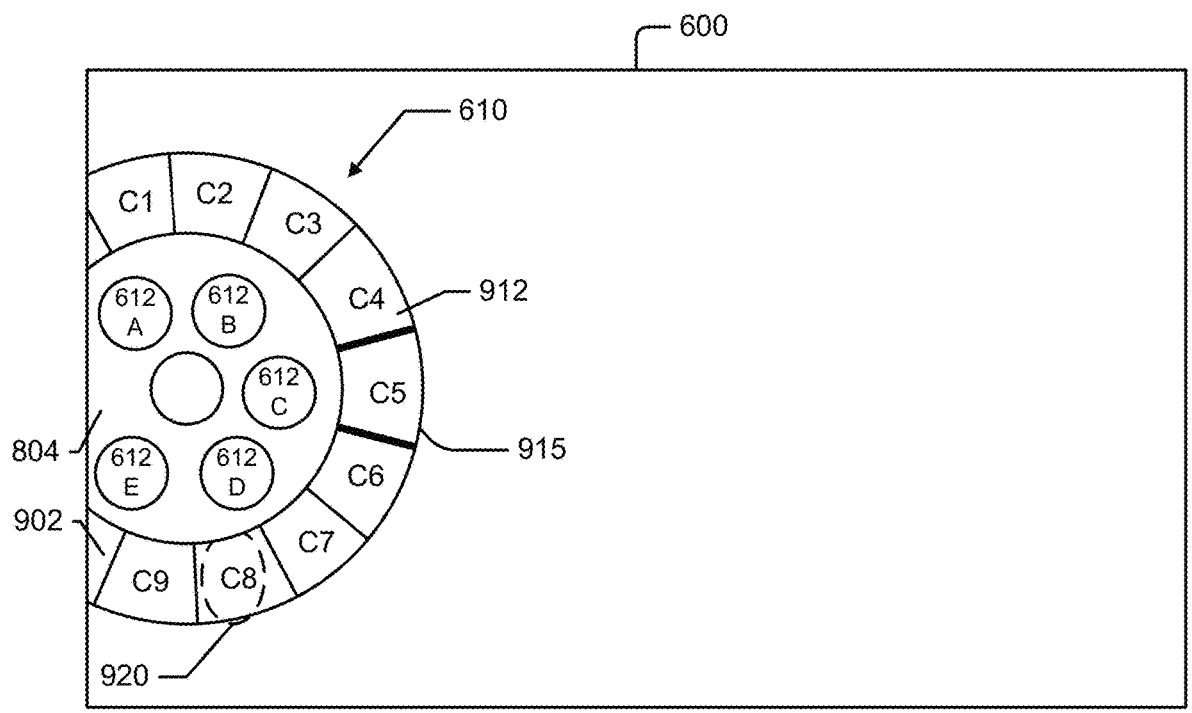
FIG. 9A illustrates the radial menu including a second sequence of selectable options, in accordance with some embodiments.

Some embodiments of the radial menu 610 have one or more additional rings displaying options other than the options 612. FIGS. 9A-9E illustrate some embodiments of a radial menu 610 including a second ring 902, concentric to and outside the first ring 804 displaying the first sequence of selectable options 612. The second ring 902 includes a second sequence of selectable options 912 associated with one of the options 612 in the first sequence. For example, the second sequence of options 912 includes options C1, C2, C3, and so forth, which are sub-options of the option 612C. The second ring 902 also includes a second selection region 915 at a second fixed location on the radial menu 610. For example, the second selection region 915 is a fixed portion of the second ring 902. In the example of FIG. 9A, the option C5 is displayed in the second selection region 915. In some embodiments, the second selection region 915 is visually demarcated on the radial menu 610 by lines or shading, or displayed in a different color than other portions of the second ring 902. Alternatively, the second selection region 915 may be identified by an indicator (such as a line or arrow), or may not be visually distinguished from other portions of the radial menu 610.

Figure 9B:
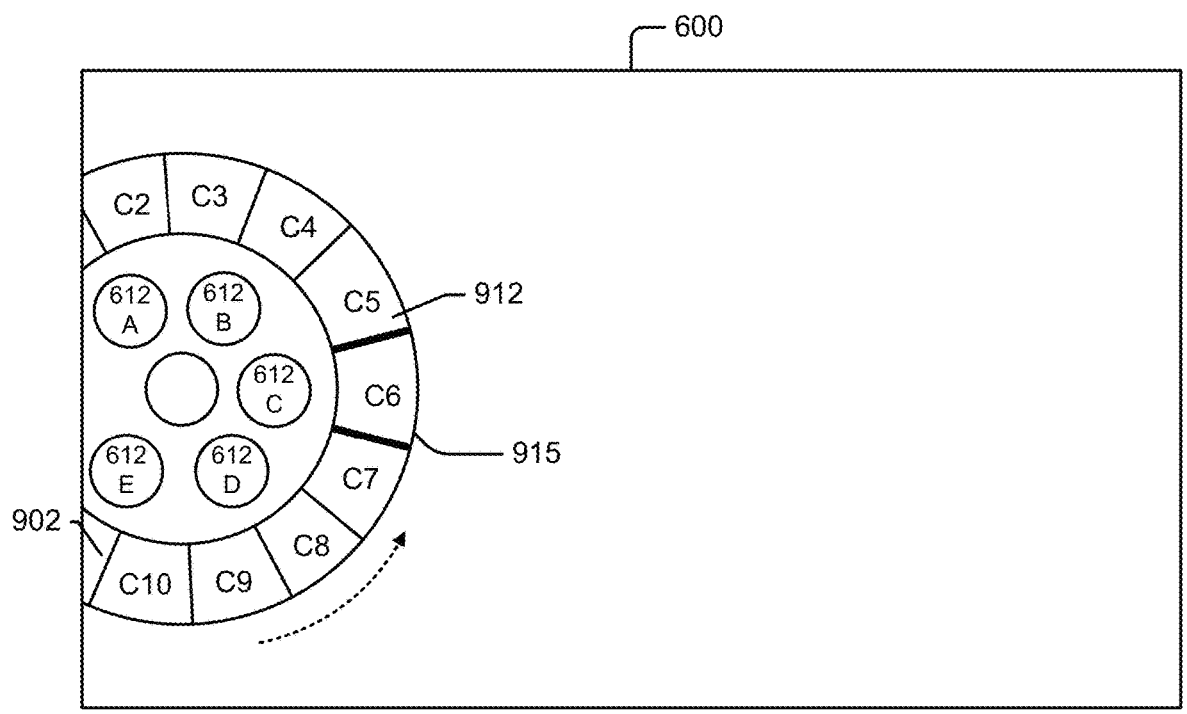
FIGS. 9B-9C illustrate sliding the second sequence of options around a second ring of the radial menu, in accordance with some embodiments.
Figure 9C:
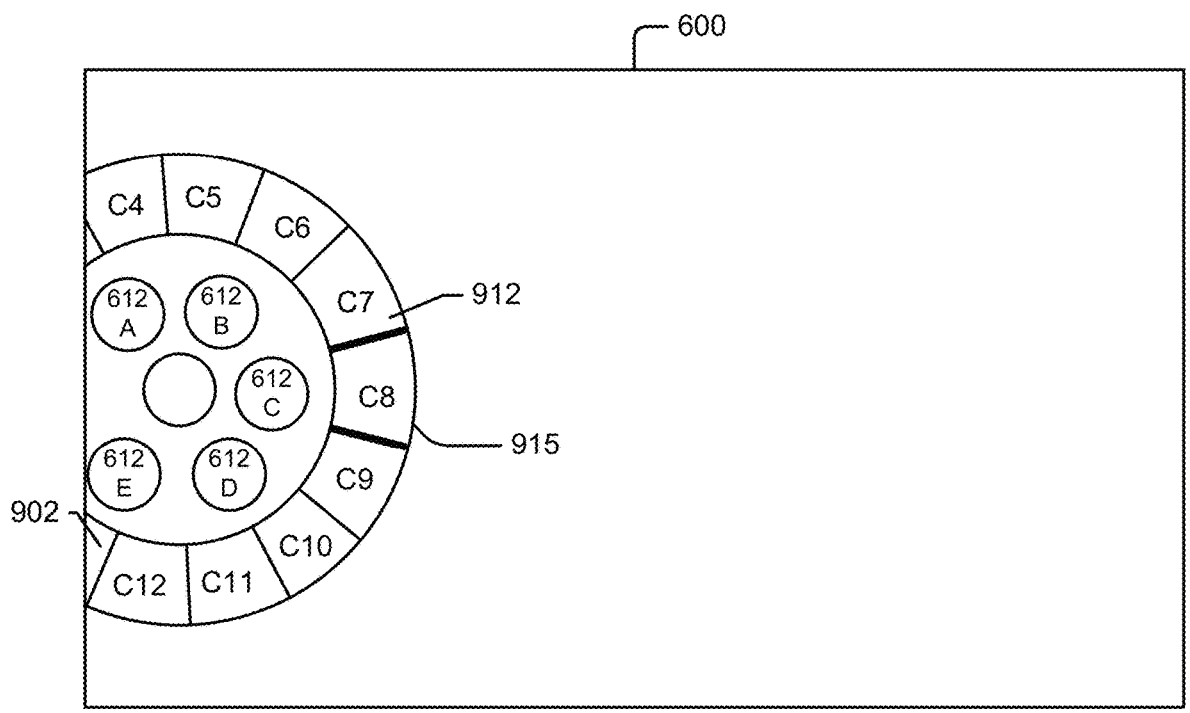

While a first option in the second sequence of options 912 is displayed in the second selection region 915 (e.g., the option C5 shown in FIG. 9A), the electronic device detects a second option-selection input 920 associated with the second ring 902. In response to detecting the input 920, the electronic device slides the second sequence of selectable options 912 around the second ring 902 to move the first option C5 in the second sequence out of the selection region 915 and to move a second option (e.g., option C8) in the second sequence of selectable options into the second selection region 915. FIG. 9B illustrates the selectable options 912 partially rotated around the second ring 902 (e.g., so that the option C6 is displayed in the second selection region 915), and FIG. 9C illustrates a final position of the selectable options 912 with the option C8 displayed in the selection region 915.

In some embodiments, as shown for example in FIG. 9A, the input 920 is a selection input (e.g., a tap input on a touchscreen display) at a location on the display 600 that corresponds to the second option C8. In some embodiments, the input 920 includes a movement (such as a swipe gesture or a drag gesture on a touch-sensitive surface or a lateral movement of a mouse) at a location corresponding to a side of the second ring 902, and the second sequence of options 912 is scrolled in accordance with a direction of the movement and the side of the second ring.

Figure 9D:
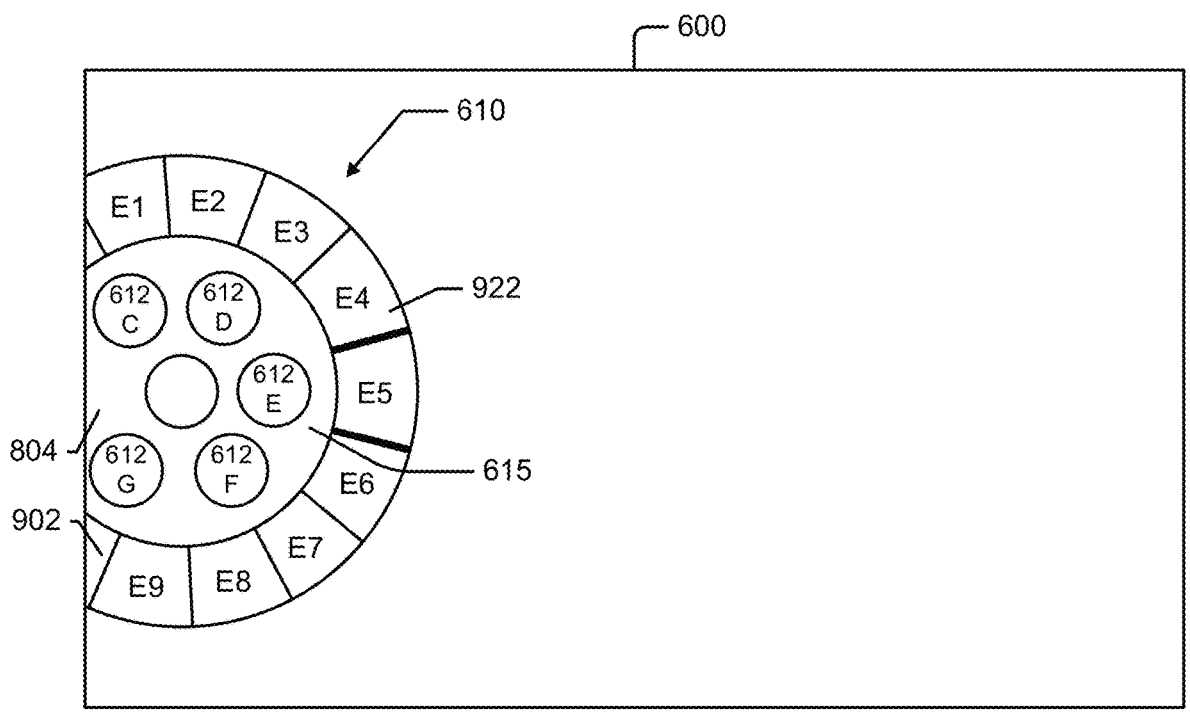
FIG. 9D illustrates the radial menu including a third sequence of selectable options, in accordance with some embodiments.

The first ring 804 and second ring 902 of the radial menu 610 may be independently scrollable. For example, FIG. 9D illustrates the first ring 804 has been rotated to move the option 612C out of the first selection region 615 and to move the option 612E into the first selection region 615. In some embodiments, in response to moving the option 612E into the first selection region 615, the electronic device displays in the second ring 902, a third sequence of selectable options 922 that are associated with the option 612E (e.g., options E1, E2, E3, etc. are sub-options of the option 612E). For example, the electronic device replaces the second sequence of options 912 (associated with the option 612C) with the third sequence of options 922 in the second ring 902.

Figure 9E:
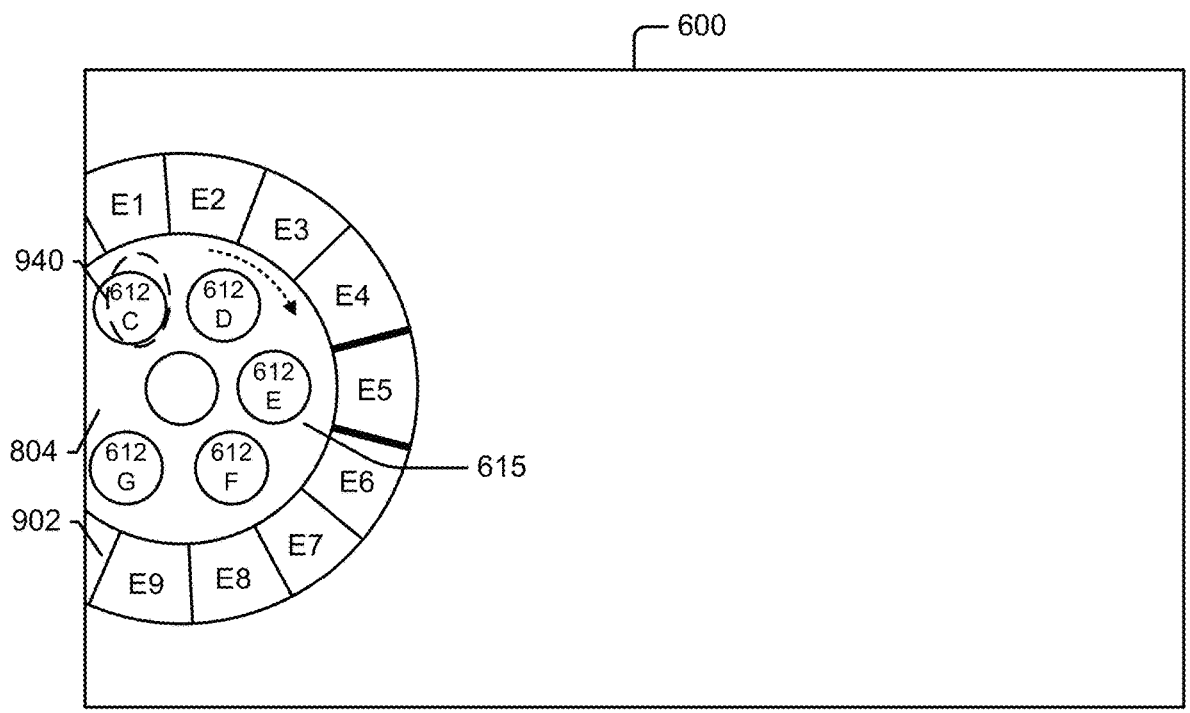
FIG. 9E illustrates a first ring of the radial menu rotated while a second ring is displayed, in accordance with some embodiments.
Figure 9F:
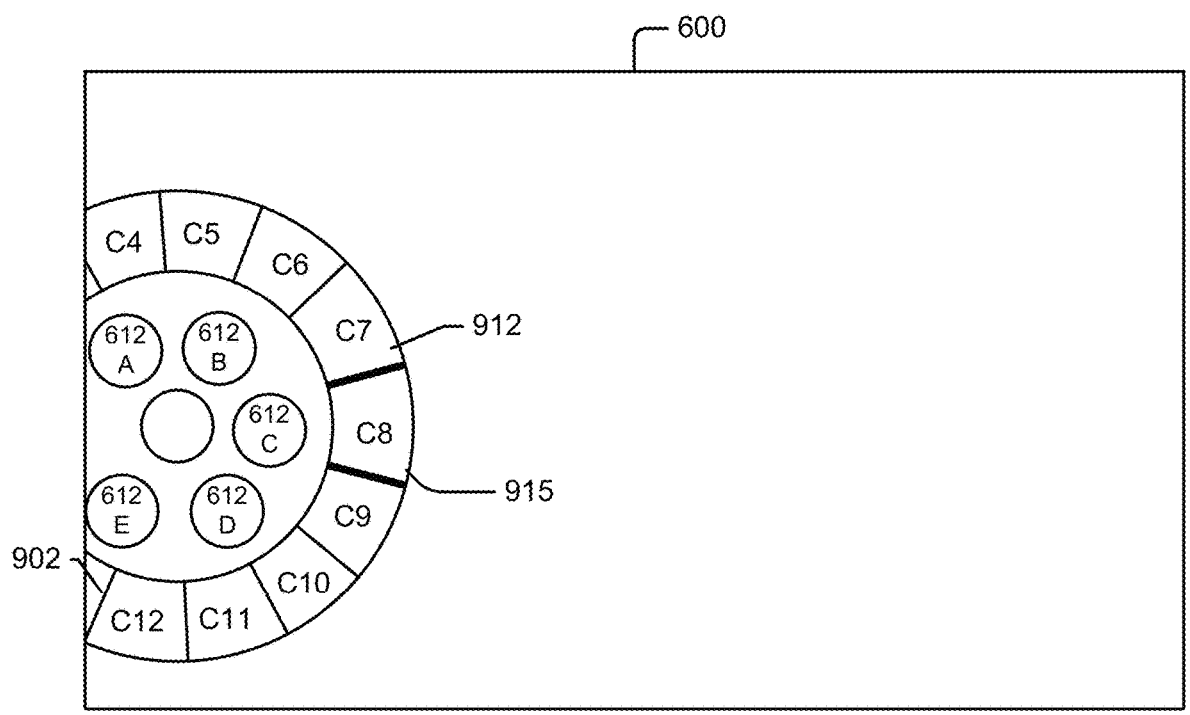
FIG. 9F illustrates the second sequence of options displayed in response to rotating the first ring, in accordance with some embodiments.

In some embodiments, the electronic device maintains a selected option 912 in the second sequence when the third sequence of options 922 replaces the second sequence in the second ring 902. For example, FIG. 9E illustrates a third option-selection input 940 associated with the first ring 804 received by the electronic device. Responsive to detecting the input 940, the electronic device slides the first sequence of options 612 around the first ring 804 to move the option 612E out of the first selection region 615 and to move the option 612C into the first selection region 615. After rotating the first ring 804, the electronic device displays the second sequence of options 912 associated with the option 612C in the second ring 902, as shown in FIG. 9F. The second option C8 in the second sequence, selected prior to the rotation of the first ring 804, is displayed in the second selection region 915.

Figure 10A:
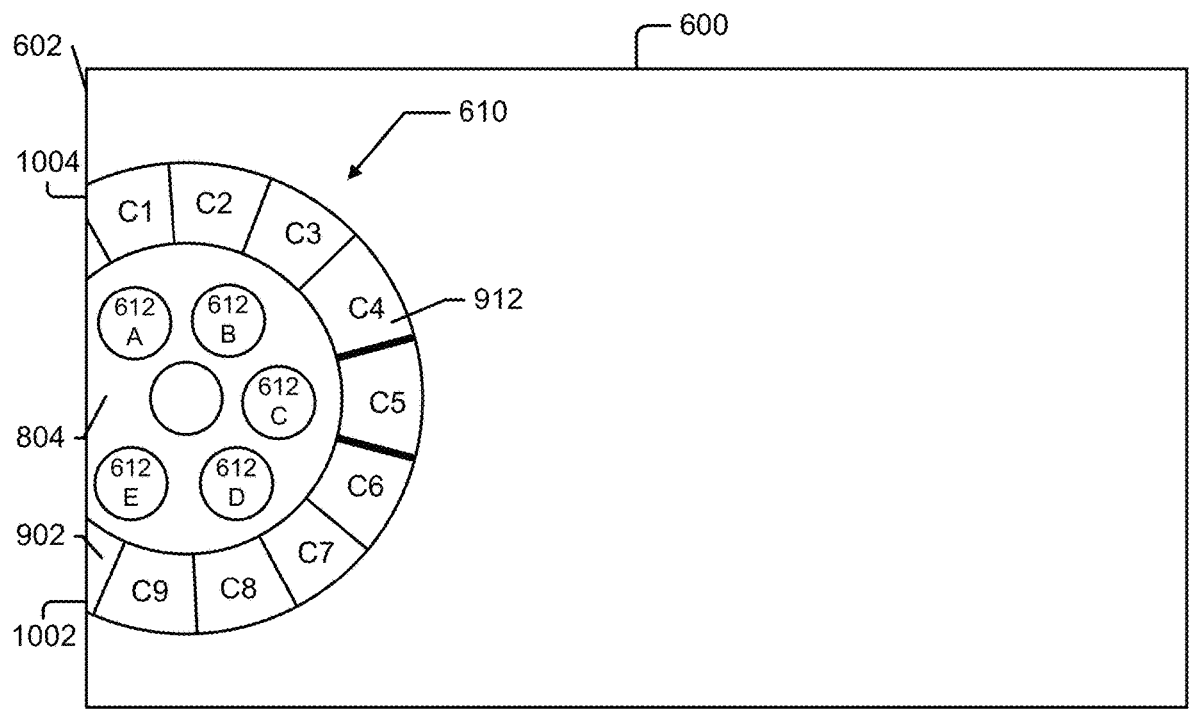
FIGS. 10A-10D illustrate sliding the second sequence of selectable options around the radial menu, in accordance with some embodiments.
Figure 10B:
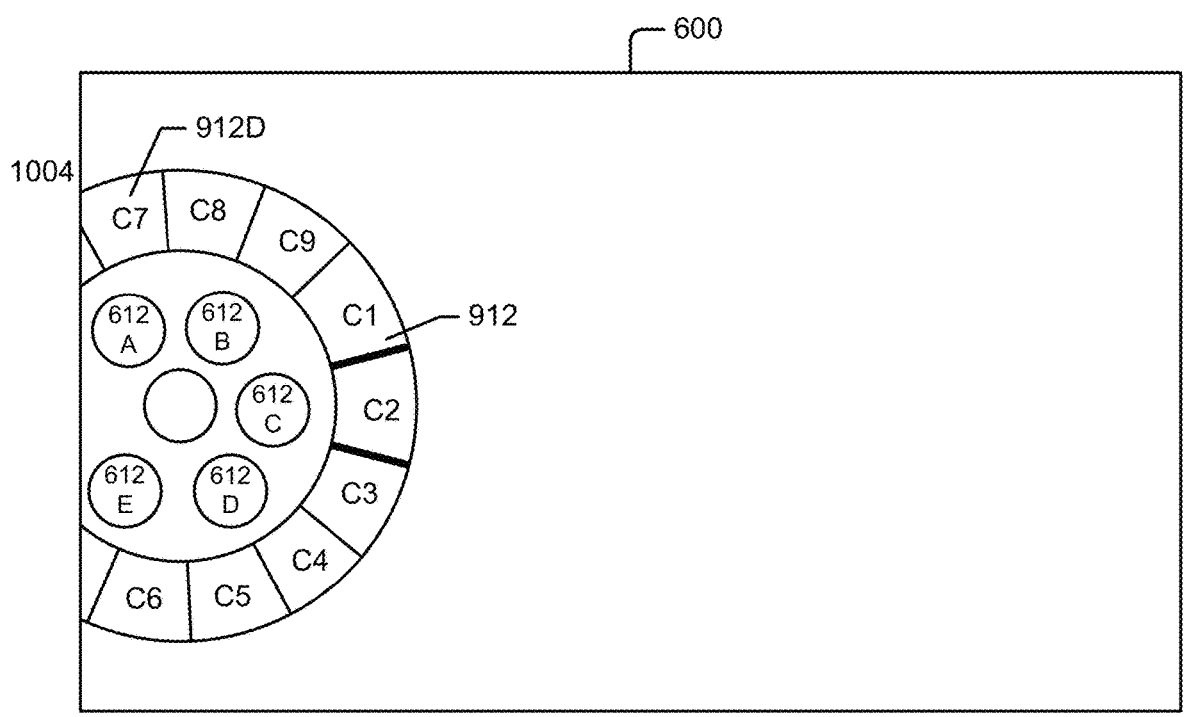
Figure 10C:
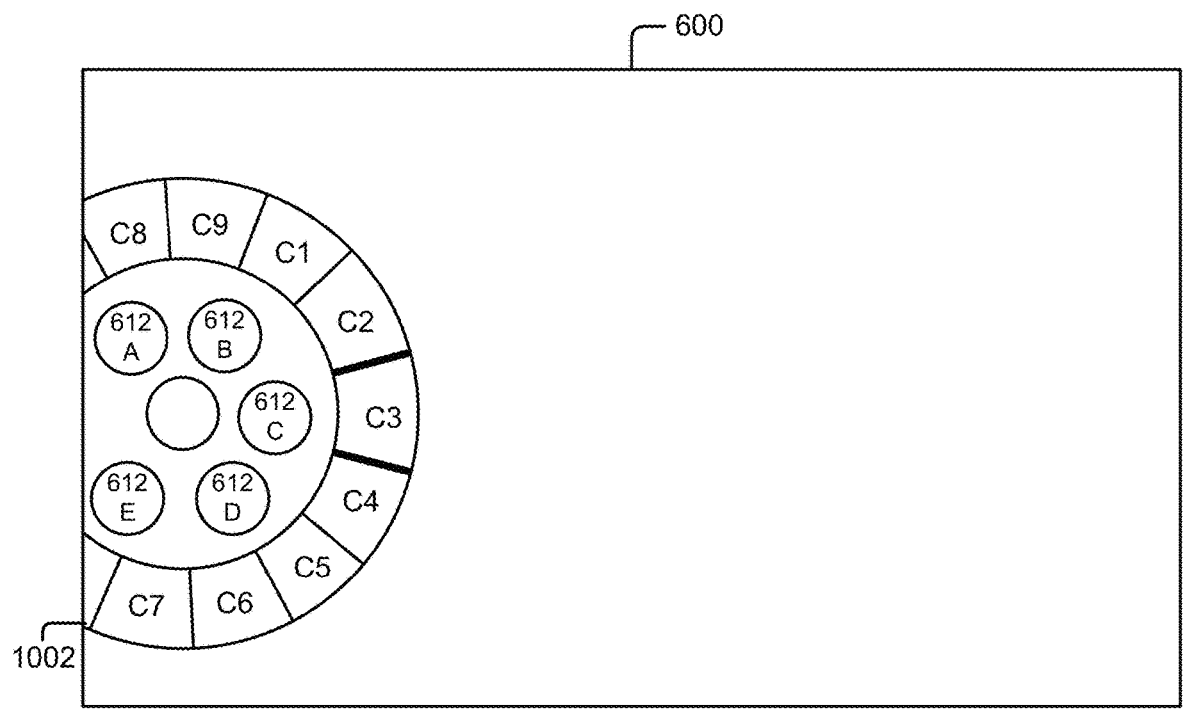
Figure 10D:
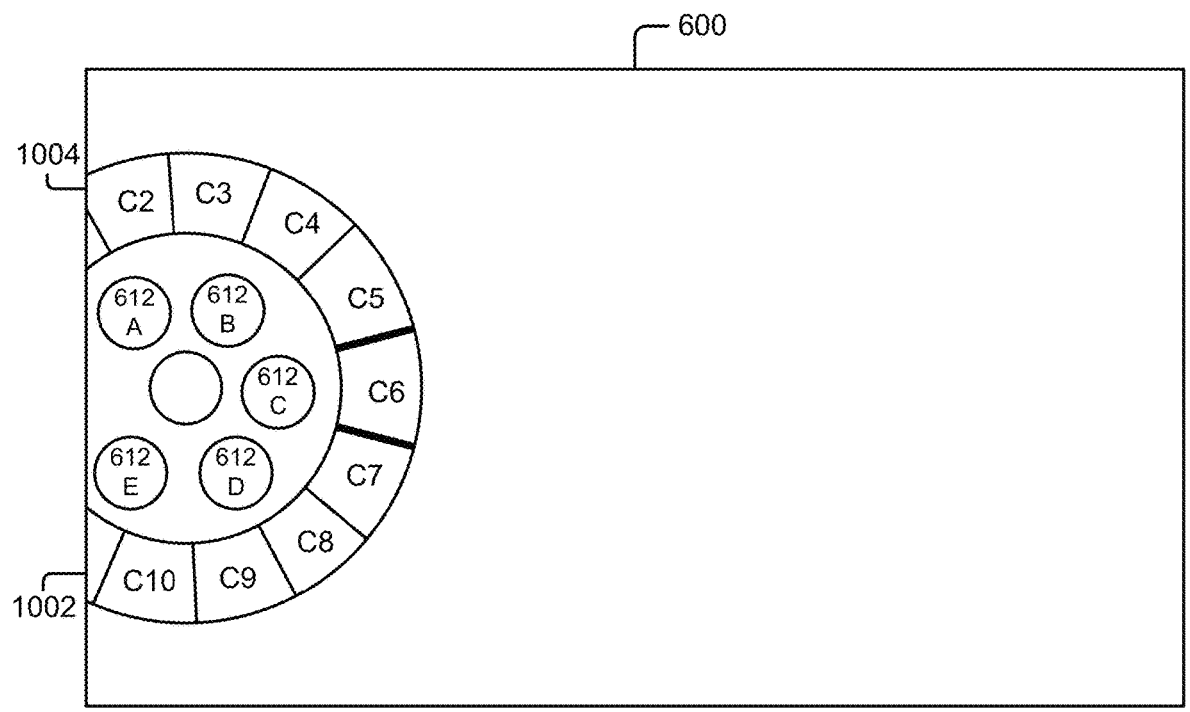

FIGS. 10A-10D illustrate some embodiments for sliding the selectable options 912 around the second ring 902 of the radial menu 610. As shown in FIG. 10A, the second ring 902 is displayed with a first boundary 1002 and a second boundary 1004 at the edge 602 of the display 600. The electronic device slides the options 912 around the second ring 902 such that an option (e.g., the option C7) slides to the second boundary 1004 (e.g., from the first boundary 702 or from a position on the second ring 902 between the first boundary 1002 and the second boundary 1004). FIG. 10B illustrates the option C7 slid to the second boundary 1004. In some embodiments, in response to further sliding the sequence of selectable options 912 around the second ring 902, the electronic device slides the option C7 off the radial menu at the second boundary 1004 and redisplays the option C7 at the first boundary 1002, as shown in FIG. 10C. In some embodiments (e.g., where option C7 is not redisplayed at the first boundary), in response to further sliding the sequence of selectable options 912 around the second ring 902, the electronic device slides the option C7 off the second ring 902 at the second boundary 1004 and displays another option C10 at the first boundary 1002, as shown in FIG. 10D.

Figure 11A:
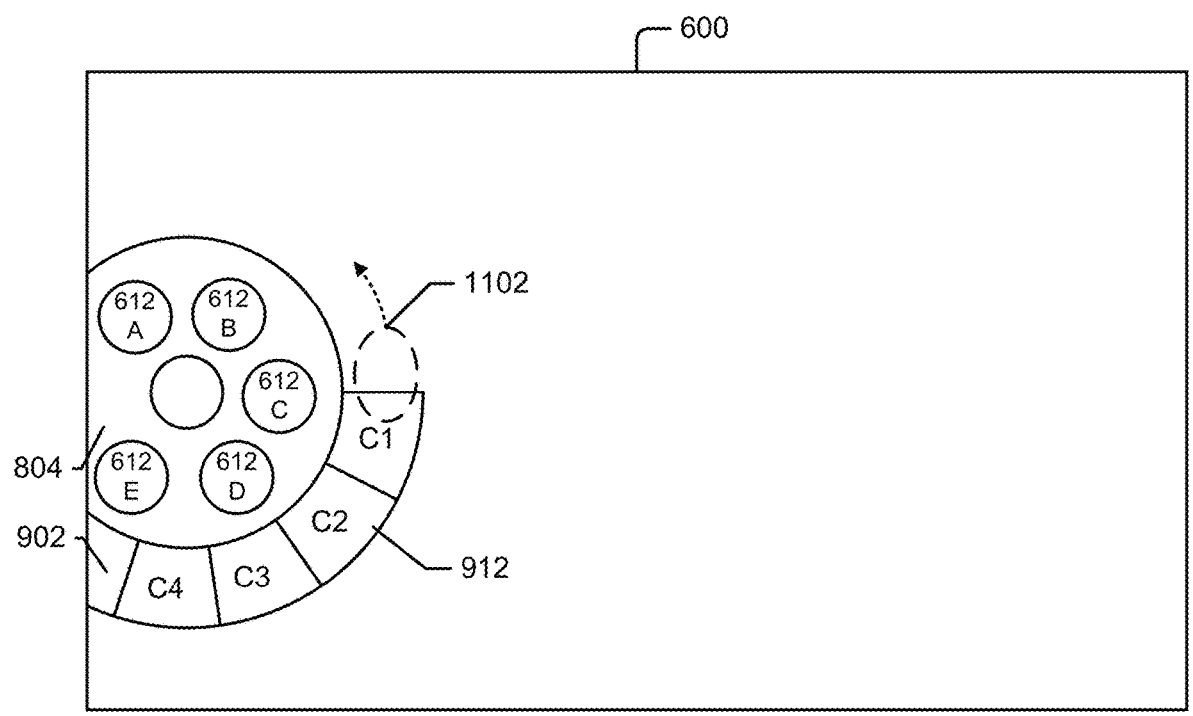
FIG. 11A illustrates the second ring of the radial menu partially surrounding the first ring, in accordance with some embodiments.
Figure 11B:
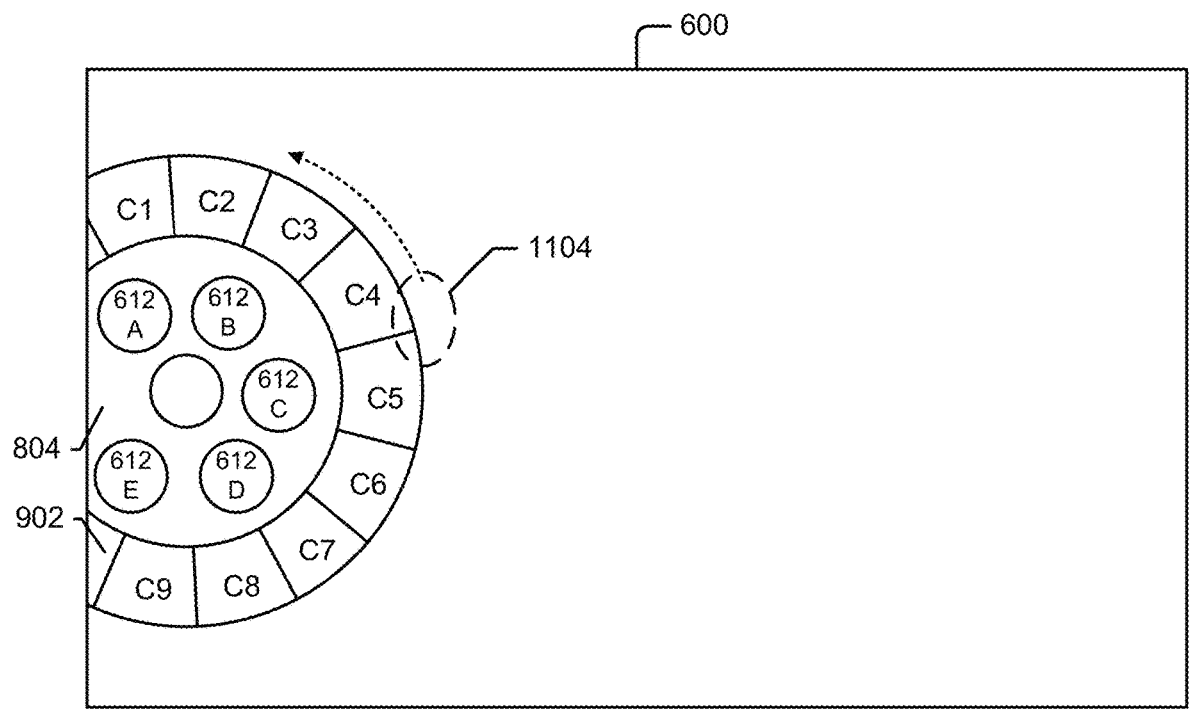
FIG. 11B illustrates the second ring of the radial menu fully surrounding the first ring, in accordance with some embodiments.
Figure 11C:
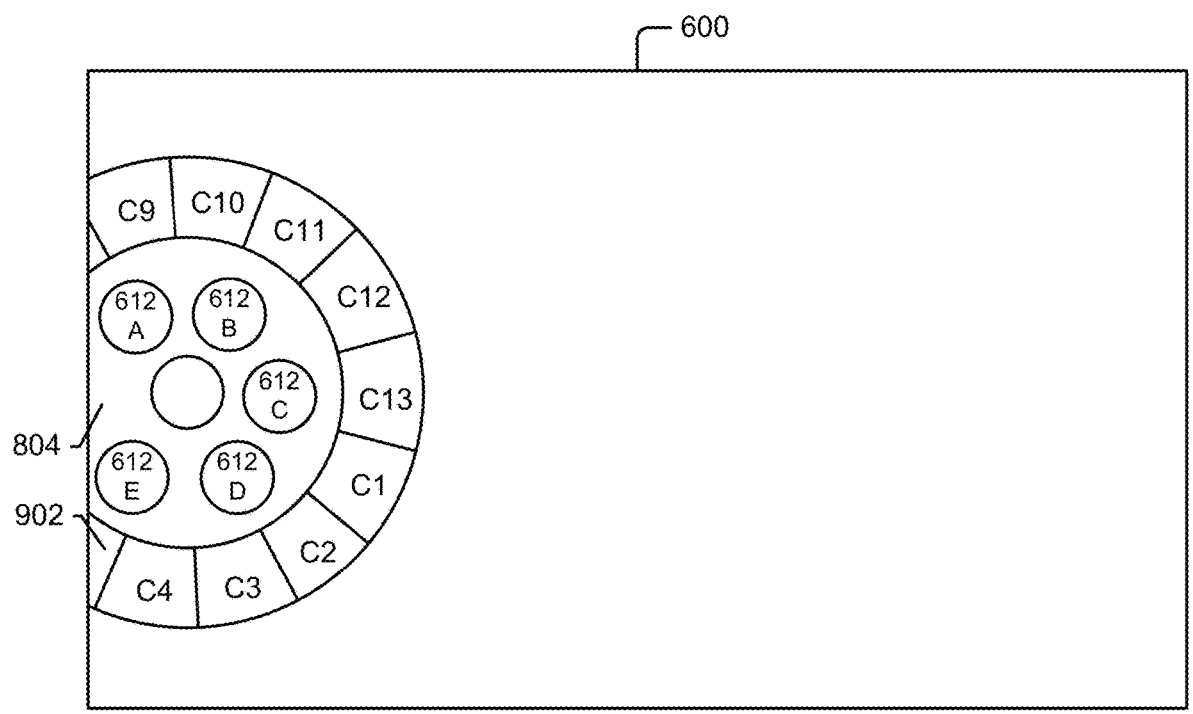
FIG. 11C illustrates options slid around the second ring of the radial menu, in accordance with some embodiments.

FIG. 11A illustrates the second ring 902 in some embodiments surrounds a portion of the first ring 804 before the second sequence of options 912 are slid around the second ring. In response to an input 1102 (e.g., a swipe gesture received at the display 600 in an upward or counter-clockwise direction), the electronic device slides the options 912 around the second ring 902. As the options 912 are slid around the second ring 902, the electronic device increases the portion of the first ring 804 that is surrounded by the second ring 902. For example, FIG. 11B illustrates the second ring 902 fully surrounds the first ring 804. In some embodiments, as also shown in FIG. 11B, the second ring 902 contains more options than can be displayed by the second ring 902 fully surrounding the first ring 804. In response to a user input 1104 (e.g., a swipe gesture in an upward or counterclockwise direction), the electronic device continues sliding the options 912 around the second ring 902. FIG. 11C illustrates the options 912 slid around the second ring 902 in response to the user input 1104. In some embodiments, user inputs received in opposite directions from those shown in FIGS. 11A and 11B slide the options 912 around the second ring 902 in the opposite direction. For example, in response to a user input received at the second ring 902 in FIG. 11C that is in the opposite direction of the user input 1104, the electronic device slides the options 912 in a clockwise direction around the ring 902. Similarly, in response to a user input received at the second ring 902 in FIG. 11B that is in the opposite direction of the user input 1102, the electronic device decreases the portion of the first ring 804 that is surrounded by the second ring 902.

Figure 12A:
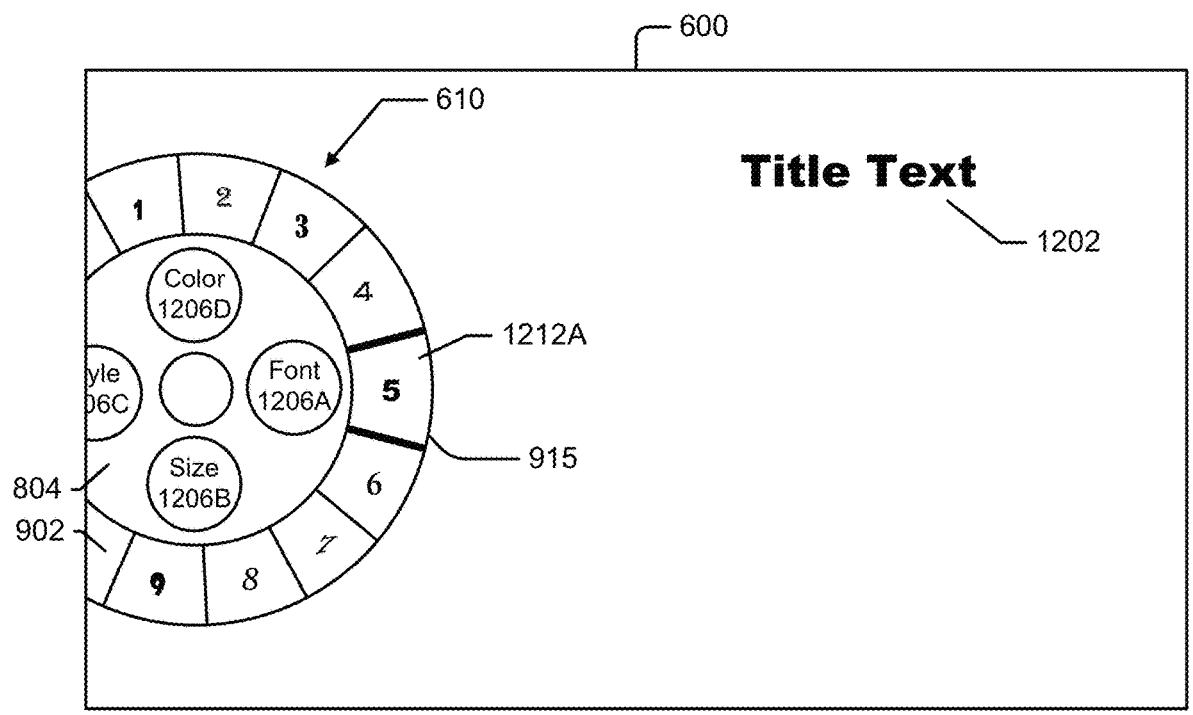
FIGS. 12A-12B illustrate applying options in the radial menu to content, in accordance with some embodiments.
Figure 12B:
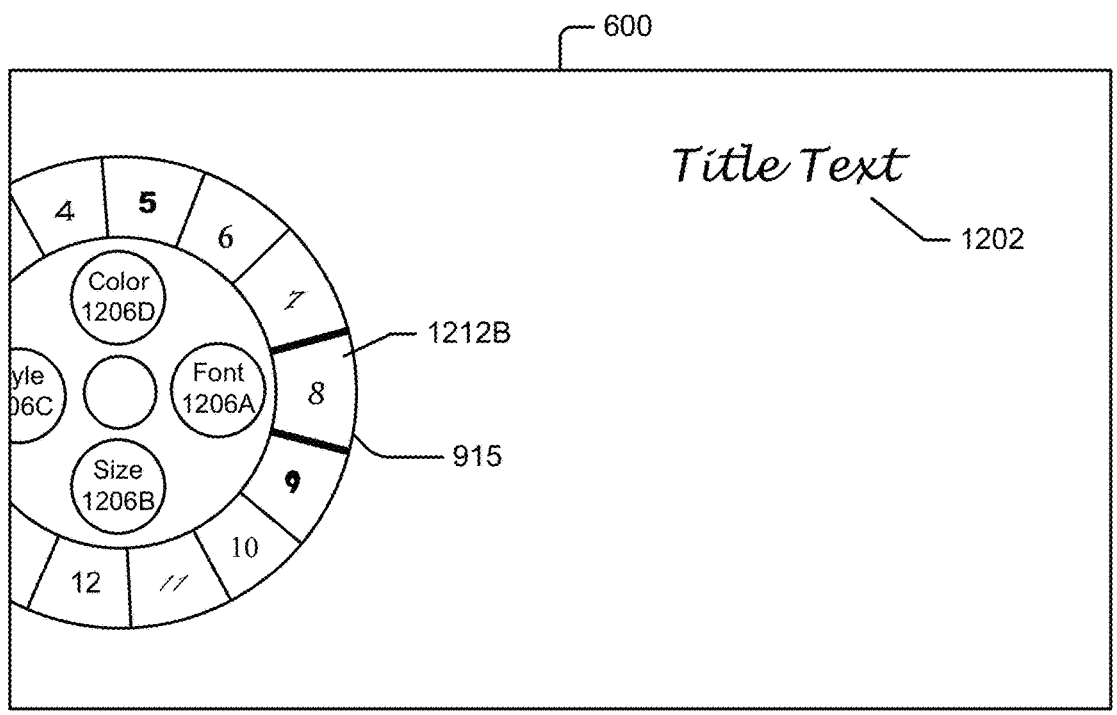

In some embodiments, the selectable options provided in the radial menu 610 are options associated with content in an application executed by the electronic device, such as actions the electronic device performs on the content. As shown in FIG. 12A, the electronic device displays the radial menu 610 over content (e.g., a photo) having a title 1202. In the example of FIG. 12A, the first ring 804 of the radial menu 610 displays selectable options 1206 related to properties of the title 1202, such as the font 1206A of the title, the size 1206B of the title, a font style 1206C of the title, and a font color 1206D of the title. The second ring 902 displays various options 1212 (e.g., specific font choices) associated with the option 1206A displayed in the first selection region 615 of the first ring 804. For example, an option 1212A is displayed in the second selection region 915 of the second ring 902. While the option 1212A is displayed in the second selection region 915, the content is displayed with an appearance that includes a preview of a first operation corresponding to the option 1212A. For example, as shown in FIG. 12A, the title 1202 is displayed with the font corresponding to the option 1212A. When the second ring 902 is rotated to display a second option 1212B in the selection region 915, the electronic device changes an appearance of the content to include a preview of a second operation corresponding to the second option 1212B. For example, as shown in FIG. 12B, the title 1202 is displayed with a font corresponding to the option 1212B. In embodiments of the radial menu 610 not including the second ring 902, the electronic device may change the appearance of the content to include a preview of an operation corresponding to an option displayed in the first ring 804.

Figure 13A:
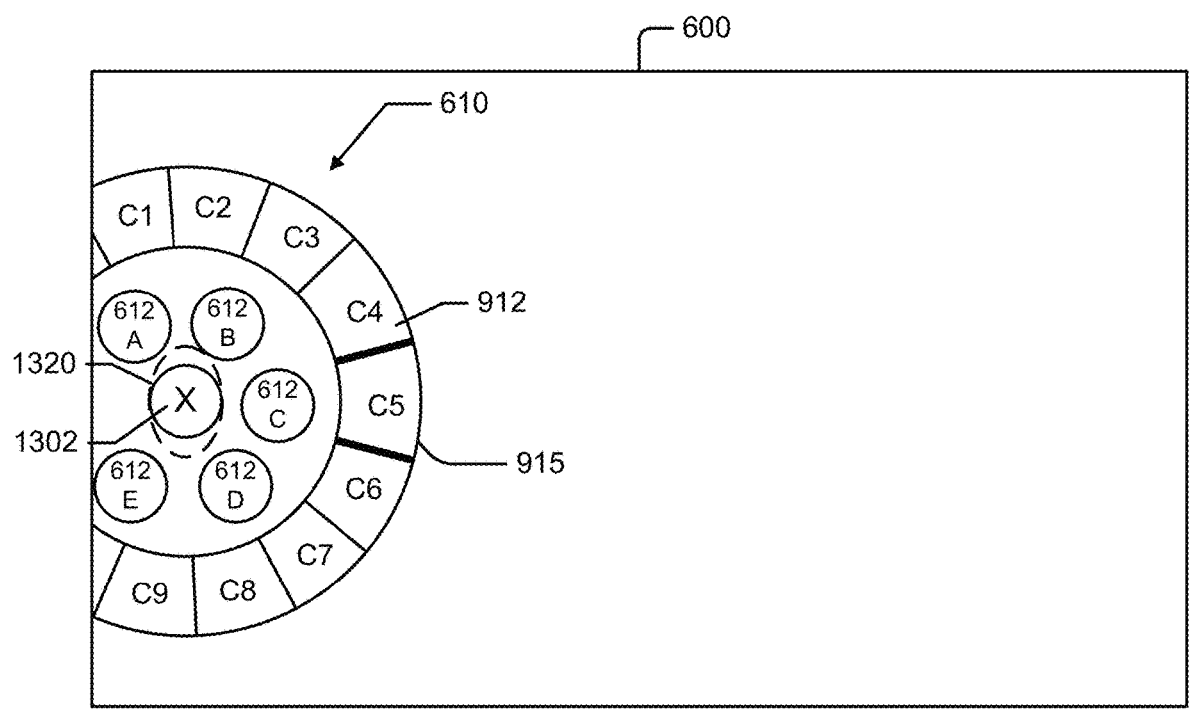
FIG. 13A illustrates a commitment input associated with the radial menu, in accordance with some embodiments.
Figure 13B:
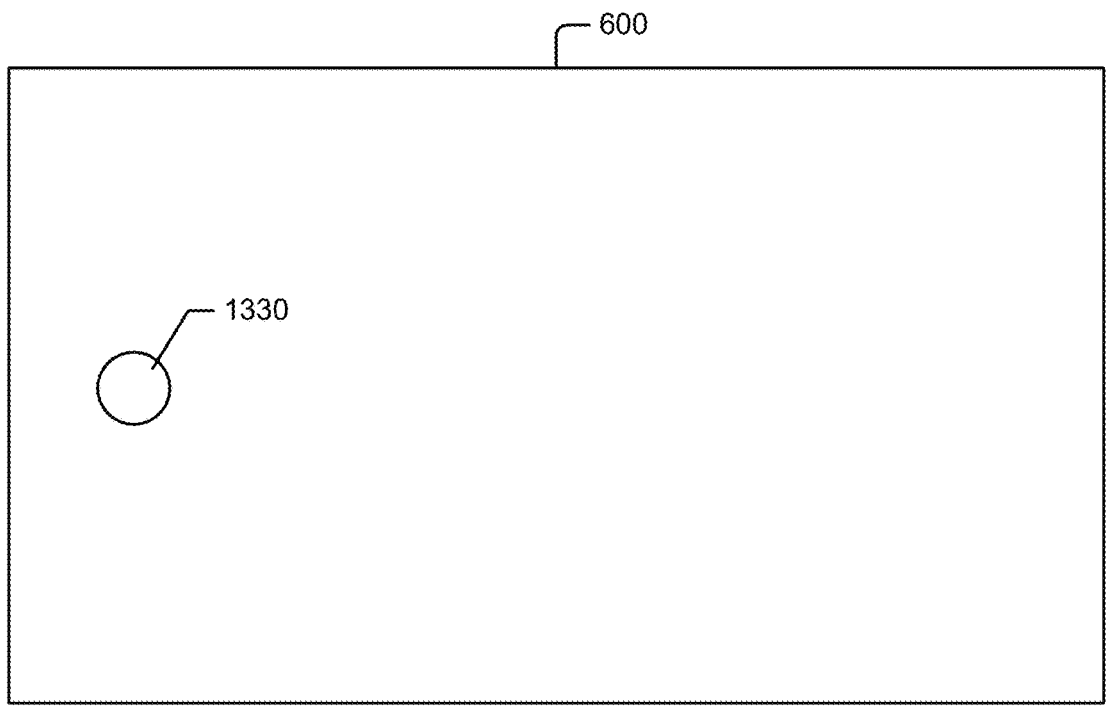
FIG. 13B illustrates the radial menu dismissed in response to the commitment input, in accordance with some embodiments.

FIGS. 13A-13D illustrate a commitment input received by the electronic device in association with the radial menu 610. In some embodiments, the commitment input includes an input 1320 at a location on the radial menu 610, such as a center 1302 of the radial menu, as shown in FIG. 13A. The commitment input may additionally or alternatively include an input at another location on the display 600, a gesture to swipe away the radial menu 610, or another type of input. In response to the commitment input, the electronic device dismisses the radial menu 610, as shown in FIG. 13B. When the menu item is dismissed, a state of the radial menu 610 (e.g., a position of the options in the menu) is stored. In some embodiments, the electronic device persistently displays a menu item 1330, a selection of which causes the electronic device to redisplay the radial menu 610.

Figure 13C:
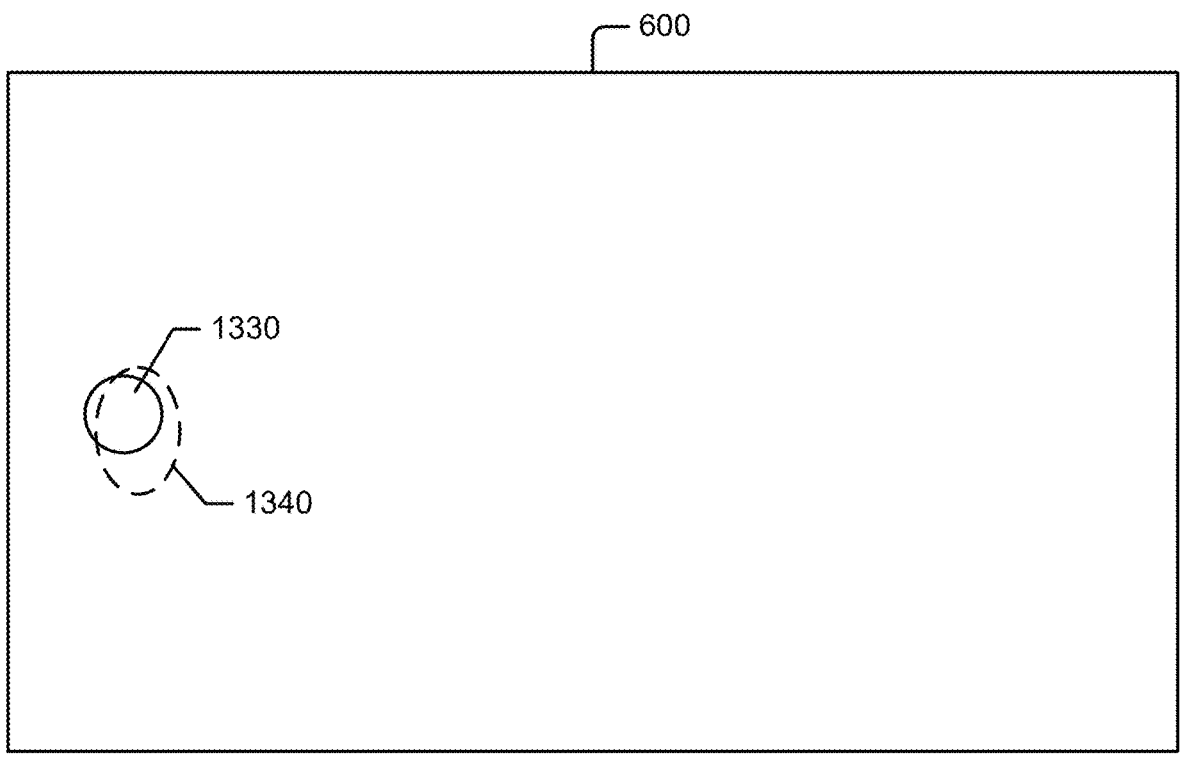
FIG. 13C illustrates an input to redisplay the radial menu, in accordance with some embodiments.
Figure 13D:
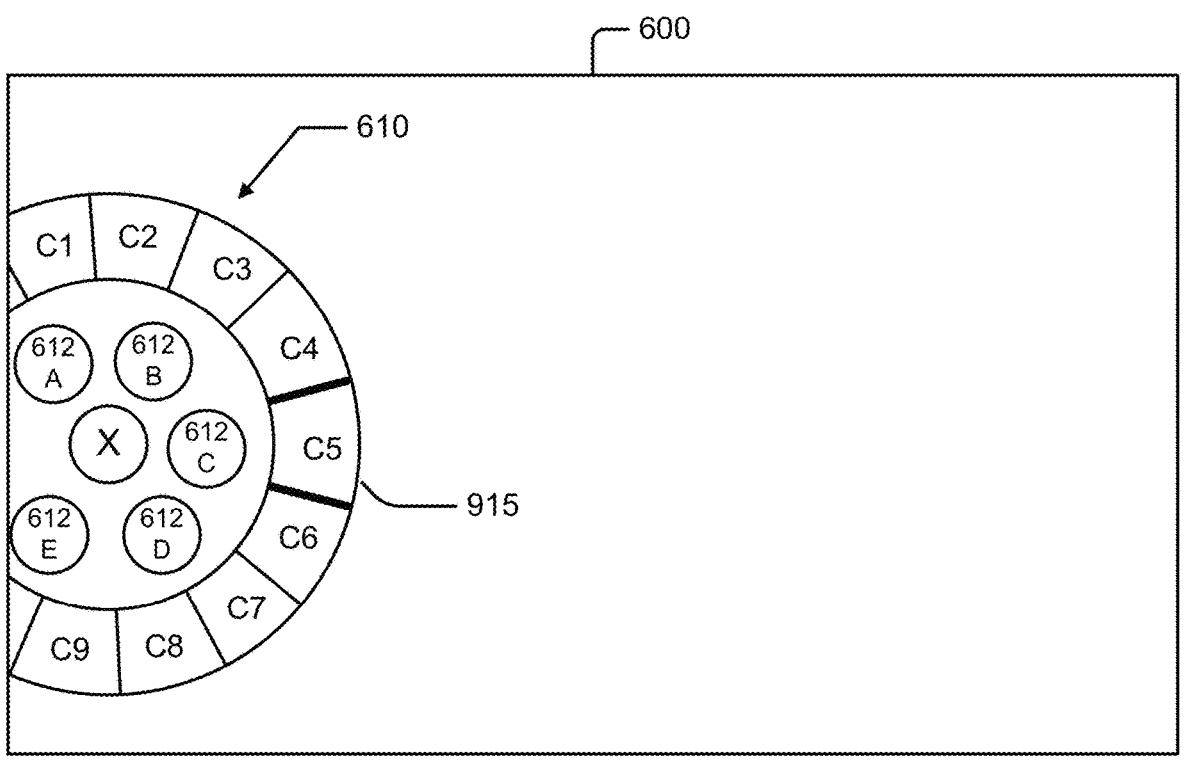
FIG. 13D illustrates the radial menu redisplayed, in accordance with some embodiments.

FIG. 13C illustrates an input 1340 received by the electronic device to redisplay the radial menu 610 (e.g., an input received at the menu item 1330). In response to the input 1340, the electronic device redisplays the radial menu 610, as shown in FIG. 13D. In some embodiments, the electronic device uses the stored state of the menu 610 to display the radial menu 610 with options selected prior to receiving the commitment input in the first selection region 615 and/or the second selection region 915. For example, as shown in FIG. 13A, the option C5 is displayed in the second selection region 915 prior to the electronic device receiving the commitment input 1320. When the radial menu 610 is redisplayed, the radial menu 610 is displayed with the option C5 in the second selection region 915, as shown in FIG. 13D.

Figure 14:
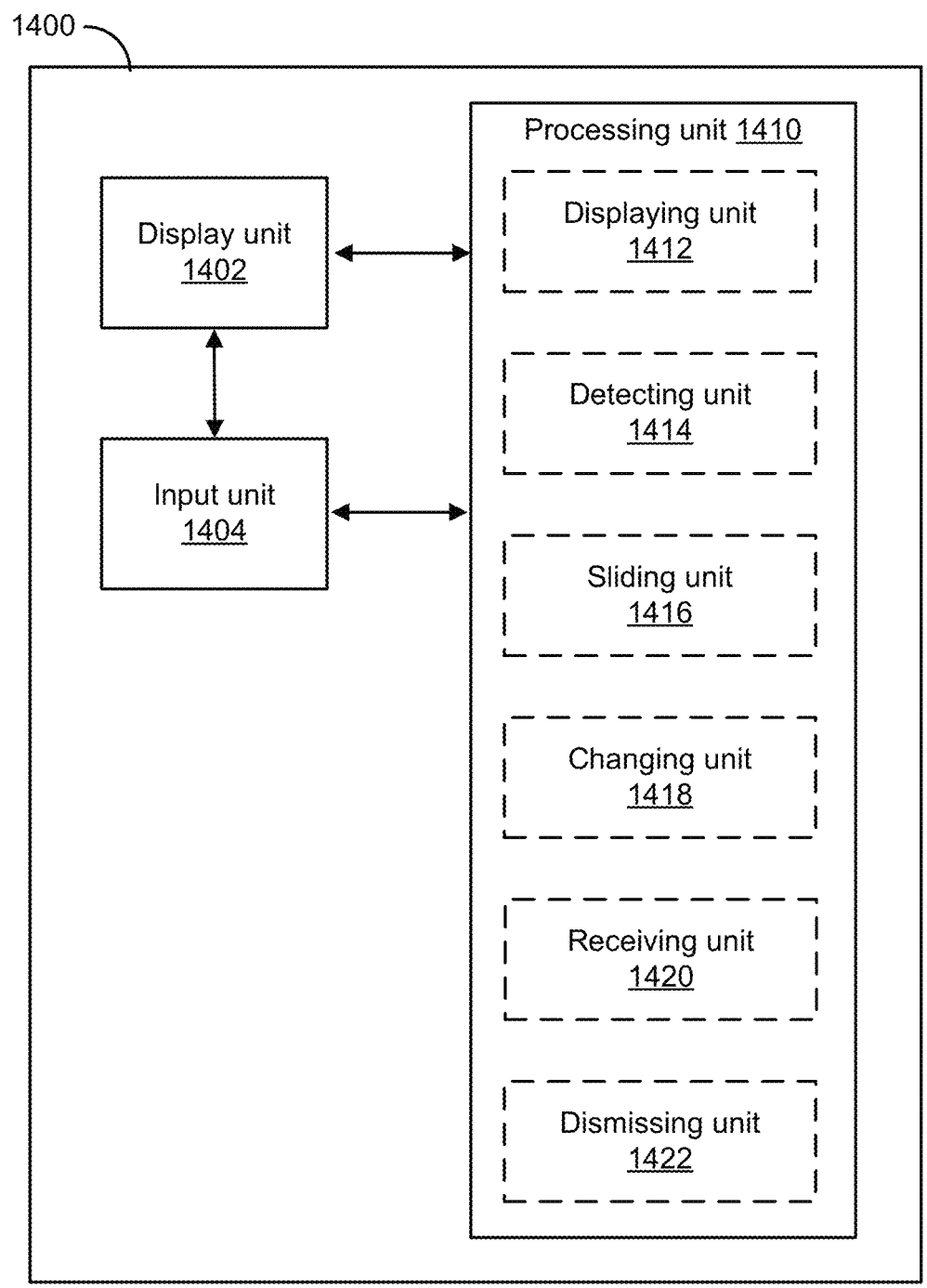
FIG. 14 is a functional block diagram of an electronic device in accordance with some embodiments.

The operations described with respect to FIG. 5 are optionally implemented by components depicted in FIG. 14. In accordance with some embodiments, FIG. 14 shows a functional block diagram of an electronic device 1400 configured in accordance with the principles of various described embodiments. The functional blocks of the device are, optionally, implemented by hardware, software, or a combination of hardware and software to carry out the principles of various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein.

As shown in FIG. 14, an electronic device 1400 includes a display unit 1402 adapted to display a user interface including windows associated with an application, an input unit 1404 adapted to receive user inputs, and a processing unit 1410 coupled to the display unit 1402 and the input unit 1404. In some embodiments, the processing unit 1410 includes a displaying unit 1412, a detecting unit 1414, a sliding unit 1416, a changing unit 1418, a receiving unit 1420, and a dismissing unit 1422.

The processing unit 1410 is configured to display (e.g., with the displaying unit 1412) a radial menu on the display unit 1402 of the electronic device 1400. The radial menu includes a first sequence of selectable options that extends off an edge of the display unit 1402 so that a first portion of the first sequence of selectable options is displayed while a second portion of the first sequence of selectable options is not displayed. The radial menu also includes a first selection region at a first fixed location on the radial menu. While a first option in the first sequence of selectable options is displayed in the first selection region of the radial menu, the processing unit 1410 is configured to detect (e.g., with the detecting unit 1414) an option-selection input associated with the radial menu. Responsive to detecting the option-selection input, the processing unit 1410 is configured to slide (e.g., with the sliding unit 1416) the first sequence of selectable options around a perimeter of the radial menu so that the first option is moved out of the first selection region of the radial menu and a second option is moved into the first selection region of the radial menu.

In some embodiments, the radial menu further includes a circular segment displayed at the edge of the display unit 1402.

In some embodiments, the radial menu further includes a center region and a circular segment, the circular segment displaying the first sequence of selectable options and surrounding a portion of the center region before the first sequence of selectable options are slid around the perimeter, and the processing unit 1410 is configured to slide (e.g., by the sliding unit 1416) the first sequence of selectable options by increasing the portion of the center region that is surrounded by the circular segment.

In some embodiments, the input includes a selection input at a location on the display unit 1402 that corresponds to the second option.

In some embodiments, the input includes a movement at a location on the display that corresponds to a side of the radial menu, and the processing unit is configured to slide (e.g., by the sliding unit 1416) the sequence of selectable options around the perimeter of the radial menu by scrolling the selectable options in accordance with a direction of the movement and the side of the radial menu.

In some embodiments, the processing unit 1410 is further configured to display (e.g., by the displaying unit 1412) a representation of the second option on the radial menu in response to the second option being moved into the selection region of the radial menu.

In some embodiments, the sequence of selectable options includes more options than can be displayed within the radial menu.

In some embodiments, the processing unit 1410 is configured to slide (e.g., by the sliding unit 1416) the sequence of selectable options by scrolling at least a subset of the second portion of options onto the display from the edge and scrolling at least a subset of the first portion of options off the display at the edge.

In some embodiments, a first boundary and a second boundary of the radial menu are displayed at the edge of the display unit 1402, and the processing unit 1410 is configured to slide (e.g., by the sliding unit 1416) the sequence of selectable options by sliding a third option around the perimeter of the radial menu to the second boundary. The processing unit 1410 is further configured to slide (e.g., by the sliding unit 1416) the third option off the radial menu at the second boundary responsive to further sliding the sequence of selectable options around the perimeter of the radial menu. The processing unit 1410 redisplays (e.g., by the displaying unit 1412) the third option of the radial menu at the first boundary.

In some embodiments, a first boundary and a second boundary of the radial menu are displayed at the edge of the display unit 1402, and the processing unit 1410 is configured to slide (e.g., by the sliding unit 1416) the sequence of selectable options by sliding a third option around the perimeter of the radial menu to the second boundary. The processing unit 1410 is further configured to slide (e.g., by the sliding unit 1416) the third option off the radial menu at the second boundary responsive to further sliding the sequence of selectable options around the perimeter of the radial menu. The processing unit 1410 displays (e.g., by the displaying unit 1412) a fourth option at the first boundary.

In some embodiments, the radial menu is displayed over content. While the first option is displayed in the first selection region, the processing unit 1410 is further configured to display (e.g., by the displaying unit 1412) the content with an appearance that includes a preview of a first operation corresponding to the first option. While the second option is displayed in the first selection region, the processing unit 1410 is configured to change (e.g., by the changing unit 1418) the appearance of the content to include a preview of a second operation corresponding to the second option.

In some embodiments, the processing unit 1410 is further configured to receive (e.g., by the receiving unit) a commitment input. Responsive to receiving the commitment input, the processing unit 1410 is configured to dismiss (e.g., by the dismissing unit 1422) the radial menu.

In some embodiments, the radial menu comprises a first ring displaying the first sequence of selectable options, a second ring including a second sequence of selectable options associated with the first option, and a second selection region at a second fixed location on the radial menu, wherein a first portion of the second sequence of selectable options is displayed in the second ring and a second portion of the second sequence of selectable options is not displayed. While a first option in the second sequence of selectable options is displayed in the second selection region of the radial menu, the processing unit 1410 is configured to detect (e.g., with the detecting unit 1414 a second option-selection input associated with the second ring. Responsive to detecting the second option-selection input, the processing unit 1410 is configured to slide (e.g., by the sliding unit 1416) the second sequence of selectable options around the second ring to move the first option in the second sequence out of the second selection region and to move a second option in the second sequence of selectable options into the second selection region.

In some embodiments, the processing unit 1410 is further configured to display (e.g., by the displaying unit 1412) in the second ring, a third sequence of selectable options associated with the second option responsive to moving the second option in the first sequence of selectable options into the first selection region.

In some embodiments, the processing unit 1410 is further configured to detect (e.g., by the detecting unit 1414) a third option-selection input associated with the first ring. Responsive to detecting the third option-selection input, the processing unit 1410 is configured to slide (e.g., by the sliding unit 1416) the first sequence of selectable options around the perimeter of the first ring to move the second option in the first sequence out of the first selection region and the first option in the first sequence into the first section region. The processing unit 1410 is configured to display (e.g., by the displaying unit 1412) the second sequence of selectable options in the second ring with the second option in the second sequence displayed in the second selection region.

In some embodiments, the second ring surrounds a portion of the first ring before sliding the second sequence of selectable options. The processing unit 1410 is configured to slide (e.g., by the sliding unit 1416) the second sequence by increasing the portion of the first ring that is surrounded by the second ring.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

Any of the steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer-readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   displaying a menu item on a display;
   receiving a first input that is directed to within the menu item;
   in response to receiving the first input:
     displaying a radial menu on the display, wherein the radial menu includes:
       a first sequence of selectable options that extends off of an edge of the display so that a first portion of the first sequence of selectable options is displayed while a second portion of the first sequence of selectable options is not displayed; and
       a first selection region at a first fixed location on the radial menu;
     displaying a first option, from the selectable options in the first sequence, in the first selection region in response to the first option having been selected when the radial menu was last displayed;
   while the first option in the first sequence of selectable options is displayed in the first selection region of the radial menu, detecting a second input associated with the radial menu;
   determining whether the second input corresponds to an option-selection input or a scroll movement input;
   in response to determining that the second input corresponds to the option-selection input directed to a second option within the radial menu, automatically sliding the first sequence of selectable options around a perimeter of the radial menu so that the first option is moved out of the first selection region of the radial menu and the second option is moved into the first selection region of the radial menu; and
   in response to determining that the second input corresponds to the scroll movement input not directed to the second option, automatically sliding the first sequence of selectable options around the perimeter of the radial menu by scrolling the first sequence of selectable options in accordance with a direction of the scroll movement input.

2. The method of claim 1, wherein the radial menu further includes a circular segment displayed at the edge of the display.

3. The method of claim 1, wherein the radial menu further includes a center region and a circular segment, the circular segment displaying the first sequence of selectable options and surrounding a portion of the center region before the first sequence of selectable options are slid around the perimeter, and wherein sliding the first sequence of selectable options comprises increasing the portion of the center region that is surrounded by the circular segment.

4. The method of claim 1, wherein the option-selection input corresponds to a touch input directed to the second option, and wherein the scroll movement input corresponds to a swipe gesture not directed to the second option within the radial menu.

5. The method of claim 1, further comprising:
   displaying a representation of the second option on the radial menu in response to the second option being moved into the first selection region of the radial menu.

6. The method of claim 1, wherein sliding the first sequence of selectable options comprises scrolling at least a subset of the second portion of options onto the display from the edge and scrolling at least a subset of the first portion of options off the display at the edge.

7. The method of claim 1, wherein a first boundary and a second boundary of the radial menu are displayed at the edge of the display and wherein sliding the first sequence of selectable options comprises sliding a third option around the perimeter of the radial menu to the second boundary, the method further comprising:
   responsive to further sliding the first sequence of selectable options around the perimeter of the radial menu, sliding the third option off the radial menu at the second boundary; and
   redisplaying the third option of the radial menu at the first boundary.

8. The method of claim 1, wherein a first boundary and a second boundary of the radial menu are displayed at the edge of the display and wherein sliding the first sequence of selectable options comprises sliding a third option around the perimeter of the radial menu to the second boundary, the method further comprising:
   responsive to further sliding the first sequence of selectable options around the perimeter of the radial menu, sliding the third option off the radial menu at the second boundary; and
   displaying a fourth option at the first boundary.

9. The method of claim 1, wherein the radial menu is displayed over content, the method further comprising:

while the first option is displayed in the first selection region, displaying the content with an appearance that includes a preview of a first operation corresponding to the first option; and while the second option is displayed in the first selection region, changing an appearance of the content to include a preview of a second operation corresponding to the second option.

10. The method of claim 1, further comprising:
receiving a commitment input; and
responsive to receiving the commitment input, dismissing the radial menu.

11. The method of claim 1, wherein the radial menu comprises a first ring displaying the first sequence of selectable options, a second ring including a second sequence of selectable options associated with the first option, and a second selection region at a second fixed location on the radial menu, wherein a first portion of the second sequence of selectable options is displayed in the second ring and a second portion of the second sequence of selectable options is not displayed, the method further comprising:
while a first option in the second sequence of selectable options is displayed in the second selection region of the radial menu, detecting a second option-selection input associated with the second ring; and
responsive to detecting the second option-selection input, sliding the second sequence of selectable options around the second ring to move the first option in the second sequence out of the second selection region and to move a second option in the second sequence of selectable options into the second selection region.

12. The method of claim 11, further comprising:
responsive to moving the second option in the first sequence of selectable options into the first selection region, displaying in the second ring, a third sequence of selectable options associated with the second option.

13. The method of claim 12, further comprising: detecting a third option-selection input associated with the first ring; responsive to detecting the third option-selection input, sliding the first sequence of selectable options around the perimeter of the first ring to move the second option in the first sequence out of the first selection region and the first option in the first sequence into the first selection region; and displaying the second sequence of selectable options in the second ring with the second option in the second sequence displayed in the second selection region.

14. The method of claim 11, wherein the second ring surrounds a portion of the first ring before sliding the second sequence of selectable options, and wherein sliding the second sequence comprises increasing the portion of the first ring that is surrounded by the second ring.

15. The method of claim 1, further comprising:
while displaying the radial menu, detecting a third input directed to the radial menu; and
in response to detecting the third input:
ceasing display of the radial menu; and
displaying the menu item, wherein the menu item is configured to redisplay the radial menu when selected while the radial menu is not displayed.

16. The method of claim 1, wherein the first sequence of selectable options corresponds to a sequence of settings associated with a camera application, the method further comprising, in response to determining that the second input corresponds to the option-selection input directed to the second option within the radial menu, changing a setting of the camera application according to the second option.

17. The method of claim 1, further comprising, in response to receiving the first input, ceasing to display the menu item.

18. A non-transitory computer readable storage medium storing executable code, the executable code when executed causing a processor to perform steps comprising:
displaying a menu item on a display;
receiving a first input that is directed to within the menu item;
in response to receiving the first input:
displaying a radial menu on the display, wherein the radial menu includes:
a first sequence of selectable options that extends off of an edge of the display so that a first portion of the first sequence of selectable options is displayed while a second portion of the first sequence of selectable options is not displayed; and
a first selection region at a first fixed location on the radial menu;
displaying a first option, from the selectable options in the first sequence, in the first selection region in response to the first option having been selected when the radial menu was last displayed;
while the first option in the first sequence of selectable options is displayed in the first selection region of the radial menu, detecting a second input associated with the radial menu;
determining whether the second input corresponds to an option-selection input or a scroll movement input;
in response to determining that the second input corresponds to the option-selection input directed to a second option within the radial menu, automatically sliding the first sequence of selectable options around a perimeter of the radial menu so that the first option is moved out of the first selection region of the radial menu and the second option is moved into the first selection region of the radial menu; and
in response to determining that the second input corresponds to the scroll movement input not directed to the second option, automatically sliding the first sequence of selectable options around the perimeter of the radial menu by scrolling the first sequence of selectable options in accordance with a direction of the scroll movement input.

19. The non-transitory computer readable storage medium of claim 18, wherein the radial menu comprises a first ring displaying the first sequence of selectable options, a second ring including a second sequence of selectable options associated with the first option, and a second selection region at a second fixed location on the radial menu, wherein a first portion of the second sequence of selectable options is displayed in the second ring and a second portion of the second sequence of selectable options is not displayed, the code when executed causing the processor to perform steps further comprising:
while a first option in the second sequence of selectable options is displayed in the second selection region of the radial menu, detecting a second option-selection input associated with the second ring; and
responsive to detecting the option-selection input, sliding the first sequence of selectable options around a perimeter of the radial menu so that the first option is moved out of the first selection region of the radial menu and a second option is moved into the first selection region of the radial menu.

20. The non-transitory computer readable storage medium of claim 18, wherein the option-selection input corresponds to a touch input directed to the second option, and wherein the scroll movement input corresponds to a swipe gesture not directed to the second option within the radial menu.

21. A system comprising: a non-transitory computer readable storage medium including instructions to:
    display a menu item on a display;
    receive a first input that is directed to within the menu item;
    in response to receiving the first input:
        display a radial menu on the display, wherein the radial menu includes:
            a first sequence of selectable options that extends off of an edge of the display so that a first portion of the first sequence of selectable options is displayed while a second portion of the first sequence of selectable options is not displayed; and
            a first selection region at a first fixed location on the radial menu;
    display a first option, from the selectable options in the first sequence, in the first selection region in response to the first option having been selected when the radial menu was last displayed;
    while the first option in the first sequence of selectable options is displayed in the first selection region of the radial menu, detect a second input associated with the radial menu;
    determine whether the second input corresponds to an option-selection input or a scroll movement input;
    in response to determining that the second input corresponds to the option-selection input directed to a second option within the radial menu, automatically slide the first sequence of selectable options around a perimeter of the radial menu so that the first option is moved out of the first selection region of the radial menu and a second option is moved into the first selection region of the radial menu; and
    in response to determining that the second input corresponds to the scroll movement input not directed to the second option, automatically slide the first sequence of selectable options around the perimeter of the radial menu by scrolling the first sequence of selectable options in accordance with a direction of the scroll movement input; and a processor for executing the instructions.

22. The system of claim 21, wherein the option-selection input corresponds to a touch input directed to the second option, and wherein the scroll movement input corresponds to a swipe gesture not directed to the second option within the radial menu.

\* \* \* \* \*